US008676202B2

(12) United States Patent
Hirano et al.

(10) Patent No.: US 8,676,202 B2
(45) Date of Patent: Mar. 18, 2014

(54) MOBILE TERMINAL, NETWORK NODE, AND PACKET TRANSFER MANAGEMENT NODE

(75) Inventors: Jun Hirano, Kanagawa (JP); Mohana Dhamayanthi Jeyatharan, Singapore (SG); Chan Wah Ng, Singapore (SG); Tien Ming Benjamin Koh, Singapore (SG); Chun Keong Benjamin Lim, Singapore (SG)

(73) Assignee: Panasonic Corporation, Osaka (JP)

( * ) Notice: Subject to any disclaimer, the term of this patent is extended or adjusted under 35 U.S.C. 154(b) by 994 days.

(21) Appl. No.: 12/740,326

(22) PCT Filed: Oct. 29, 2008

(86) PCT No.: PCT/JP2008/003086
§ 371 (c)(1),
(2), (4) Date: Apr. 28, 2010

(87) PCT Pub. No.: WO2009/057296
PCT Pub. Date: May 7, 2009

(65) Prior Publication Data
US 2010/0238864 A1 Sep. 23, 2010

(30) Foreign Application Priority Data
Nov. 2, 2007 (JP) ................. 2007-285617

(51) Int. Cl.
*H04W 36/00* (2009.01)

(52) U.S. Cl.
USPC ............................ 455/436; 370/331; 455/442

(58) Field of Classification Search
USPC .......... 370/329, 331, 332, 333, 401; 455/411, 455/433, 436, 437, 439, 440, 442, 443, 448
See application file for complete search history.

(56) References Cited

U.S. PATENT DOCUMENTS 6,992,995 B2   1/2006  Agrawal
2007/0249291 A1*  10/2007  Nanda et al. ................... 455/73

(Continued)

FOREIGN PATENT DOCUMENTS

EP   1 395 001    3/2004
JP   2004-80733   3/2004
WO  03/107600   12/2003

OTHER PUBLICATIONS

International Search Report dated Jan. 16, 2009.

(Continued)

*Primary Examiner* — Awet Haile
(74) *Attorney, Agent, or Firm* — Dickinson Wright PLLC

(57) ABSTRACT

A technique is disclosed, according to which a race condition between a PMIPv6 binding by a PBU message of PMIPv6 and a CMIPv6 binding by a BU message of CMIPv6 can be resolved. MN 200 has a plurality of radio communication interfaces, and a first interface is connected to MAG 220 of a home PMIPv6 domain 230, for instance. In case the connection of a second interface is changed from MAG 221 of a home PMIPv6 domain to AR 222 of a CMIPv6 domain 231, a BU message 262 is transmitted from the second interface to LMA/HA 250, and identification information of this BU message is notified to MAG from the first interface. By adding time information to this identification information and by transmitting it to LMA/HA, MAG can identify transmission time of the BU message (i.e. relative order with the other messages) from this time information.

22 Claims, 10 Drawing Sheets

(56) References Cited

U.S. PATENT DOCUMENTS

2008/0298303 A1* 12/2008 Tsirtsis .......................... 370/328
2009/0040964 A1* 2/2009 Zhao et al. .................... 370/328
2009/0073995 A1* 3/2009 Pandey et al. ................. 370/401

OTHER PUBLICATIONS

V. Varma, at al., "Mobility Management in Integrated UMTS/WLAN Networks." Communications, 2003. ICC '03. IEEE International Conference on May 2003, pp. 1048-1053.

D. Johnson, et al., "Mobility Support in IPv6," IETF RFC 3775, Jun. 2004, pp. 1-165.

S. Gundavelli, et al., "Proxy Mobile IPv6," IETF Internet-Draft, Mar. 2007, pp. 1-52.

D. Damic, et al., "Proxy Mobile IPv6 Indication and Discovery," IETF Internet-Draft, Jun. 2007, pp. 1-15.

T. Ernst, at al., "Motivations and Scenarios for Using Multiple Interfaces and Global Addresses," IETF Internet-Draft, Jul. 2007, pp. 1-24.

G. Giaretta, et al., "Interactions Between PMIPv6 and MIPv6: Scenarios and Related Issues," IETF Internet-Draft, Jul. 2007, pp. 1-19.

3GPP TR 23.882, "3GPP System Architecture Evolution: Report on Technical Options and Conclusions (Release 7),", V 1.9.0; Mar. 2007, pp. 1-184.

R. Wakikawa, at al., "Multiple Care-of Addresses Registration." IETF Internet-Draft, Jul. 2007, pp. 1-40.

\* cited by examiner

| HoA/Prefix | CoA | IF-ID/BID | Seq# | TIME STAMP |
|---|---|---|---|---|
| HOME Prefix | MAG20.CoA | IF2 | --N/A-- | T1 |
| ~~HoA~~ | ~~CoA~~ | ~~IF1~~ | ~~3127~~ | ~~N/A~~ |
| HOME Prefix | MAG21.CoA | IF1 | --N/A-- | T2 |

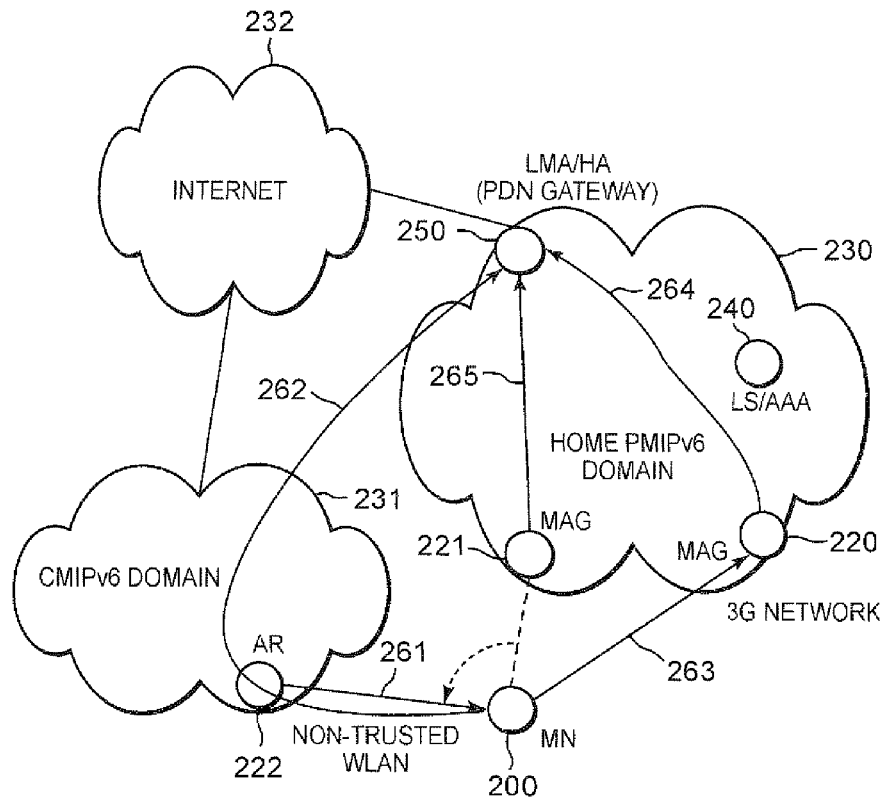

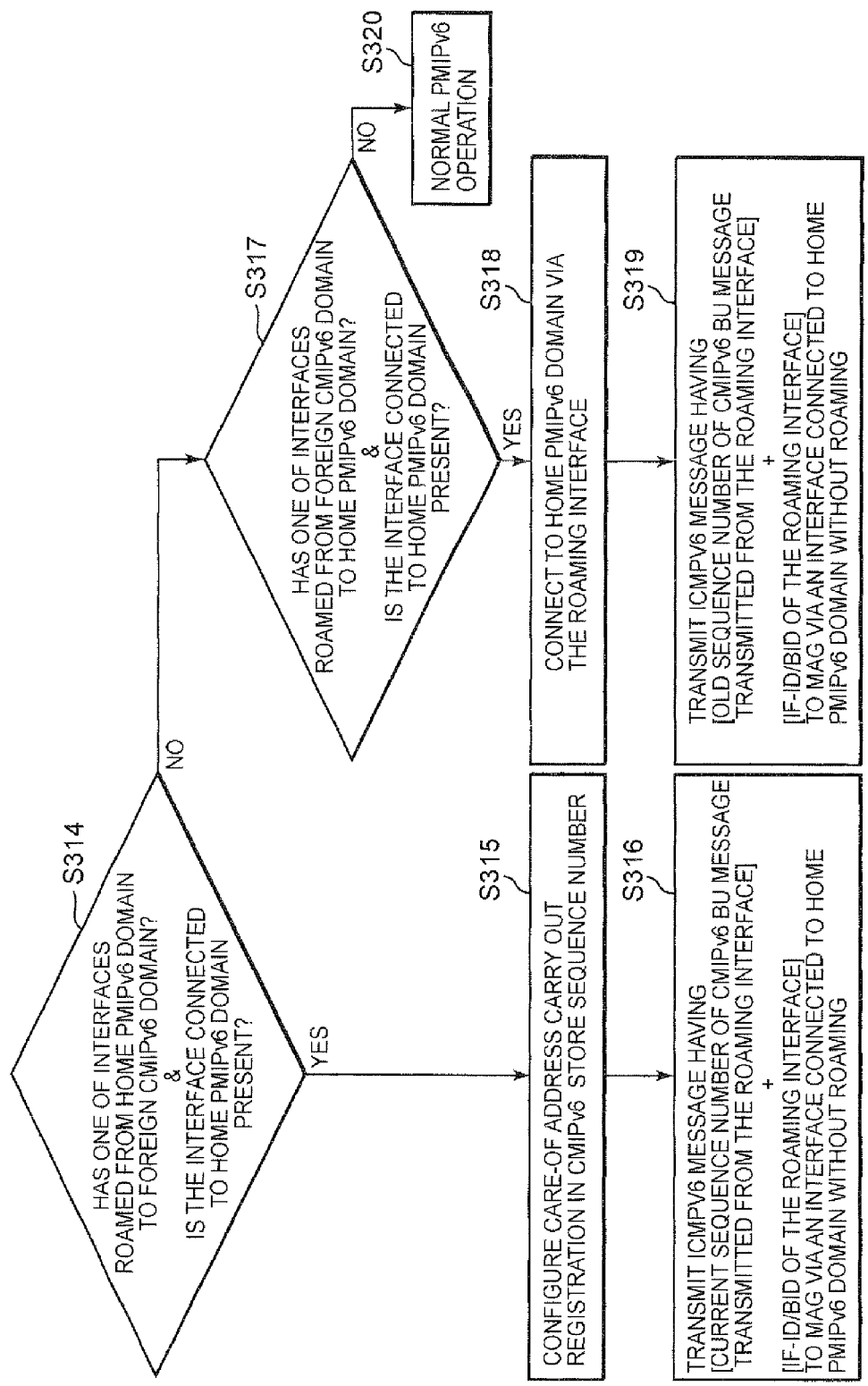

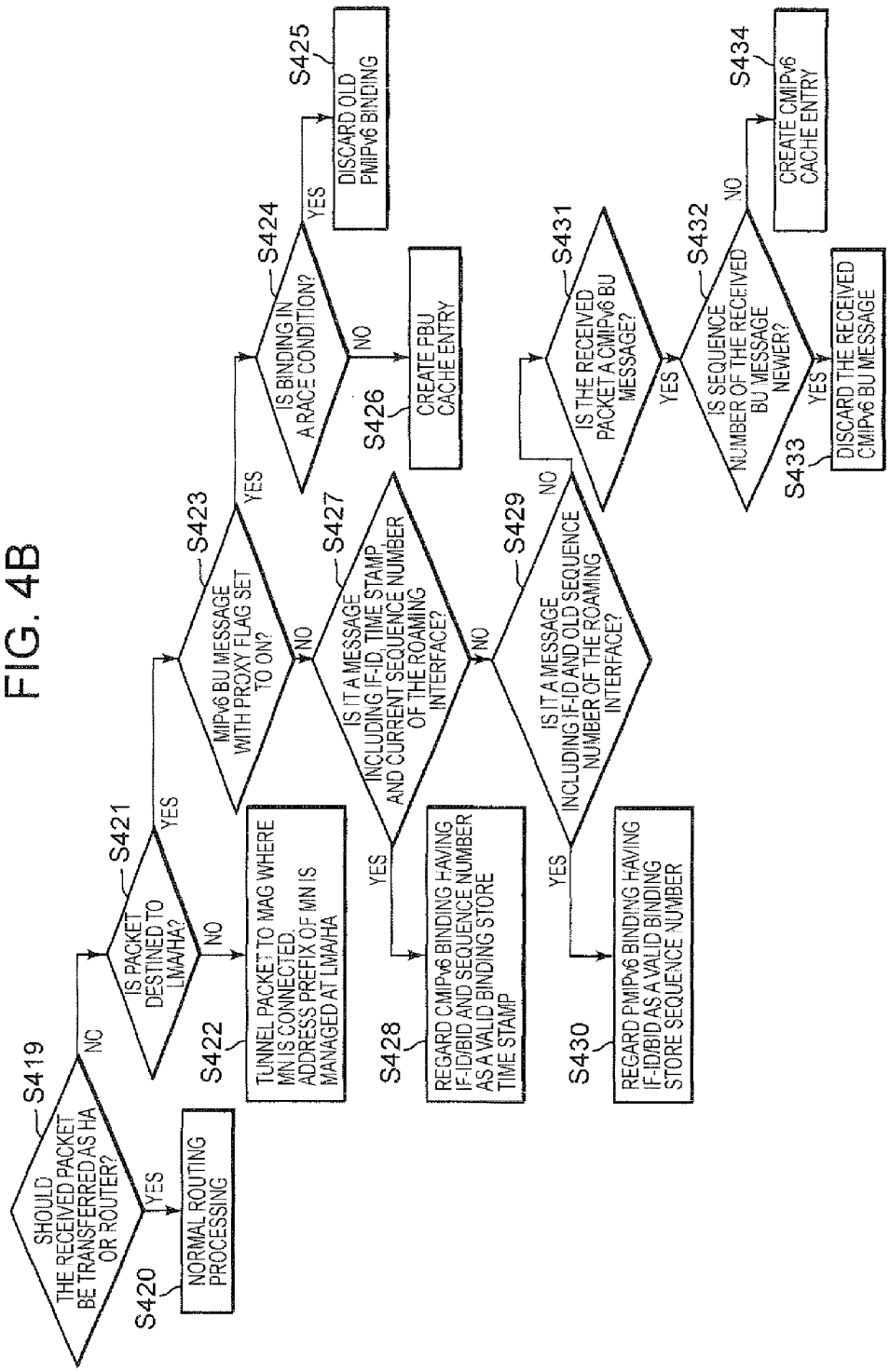

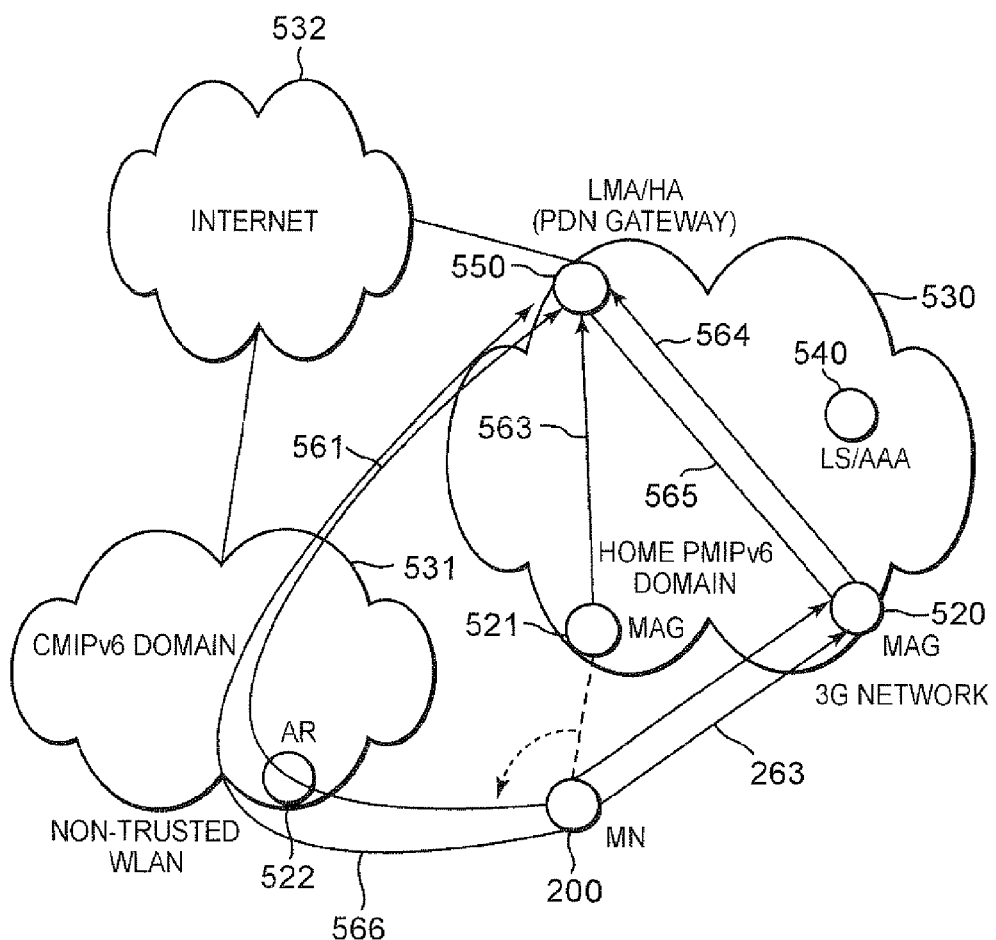

MOBILE TERMINAL, NETWORK NODE, AND PACKET TRANSFER MANAGEMENT NODE

FIELD OF THE INVENTION

The present invention relates to a mobile terminal, a network node, and a packet transfer management node relating to a communication technique using Internet Protocol (IP). In particular, the invention relates to a mobile terminal, a network node, and a packet transfer management node in a system where a mobile terminal (hereinafter may be referred as "a mobile node") having a plurality of interfaces performs communication in a network-based local mobility management domain while connection points are changed.

BACKGROUND ART

Currently, a multiple of devices are performing communication with each other by using Internet protocol. To offer mobility support to the mobile devices, IETF (Internet Engineering Task Force) defines a mobility support in IPv6 as described in the Non-Patent Document 1 given below.

In the Non-Patent Document 1, the mobility support is accomplished by introducing a home agent (HA) to a home network. A mobile node registers a care-of address (CoA) acquired in an external link at the home agent by using a BU (Binding Update) message. By the BU message, the home agent can create a binding between a home address (HoA), which is a long-term address acquired at the home link, and the care-of address.

The home agent intercepts a message directed to the home address of the mobile node, and it has a function to encapsulate a packet (this means to turn a packet to a payload of a new packet, and it is known as packet tunneling) and to transfer the packet to the care-of address of the mobile node.

One of the problems in MIPv6 (Mobile IPv6) is that MN must perform updating to one or more of HAs and CNs (correspondent nodes). This means that the load of signaling is increased for MN, which is moving at high speed. Further, it is necessary to perform RR (return Routability) or to transmit the BU message when the network connection is changed, and average handoff time at the change of the network connection is increased.

Therefore, in a session relating to a flow or a connection, considerable time is required for handoff processing. As a result, jitter or packet loss may occur. The jitter as such is not very desirable for applications requiring high immediacy such as voice-over IP (VoIP), multi-media streaming, video streaming, etc. The packet loss is not desirable for a flow, which transmits an important text and/or data information. Further, when TCP (Transmission Control Protocol) is used for transmission of important data, the throughput of TCP may be decreased due to the packet loss.

To solve such problems relating to MIPv6, attention is currently focused on a Network-based Local Mobility Management (NetLMM) protocol, and the protocol of this type is now studied and discussed in the NetLMM Working Group of IETF. The network-based local mobility management is to perform management on the mobility of a node by the network instead of a mobile node in a network segment, which is logically localized.

To attain the object as described above, MN acquires the same prefix in a local domain. In this prefix, hierarchy of routing is at a higher position so that benefit can be obtained from the local mobility management, and it should be acquired from a router, which is positioned on a default routing path of each MN in the local domain.

It is desirable that, in the routing, which is present at the top of this prefix (the uppermost position as seen from the viewpoint of hierarchy), reachability information of this prefix (a route based on the prefix) is maintained and the route based on the prefix is managed.

The best network-based local mobility management protocol as conceived by the NetLMM Working Group is the PMIPv6 (Proxy Mobile IPv6) disclosed in the Non-Patent Document 2 as given below. The PMIPv6 is so designed that the mobility of an IPv6 host can be supported in a local area of the network. The PMIPv6 can support the mobility of the IPv6 host, which is not provided with a client type mobile IPv6 (CMIPv6) stack.

In the PMIPv6, a local management signaling in a local domain to bind a local PMIPv6 prefix to a currently reachable address of MN is processed on the network side, and this is also useful for a node which has the CMIPv6 stack.

When MN having the CMIPv6 stack moves in a PMIPv6 domain (i.e. a management domain where PMIPv6 is provided) and the term of the binding registered at one or more HA and/or CN is going to expire, it may be necessary to transmit a global registration to associate an address (care-of address) of the PMIPv6 domain with the home address.

When MN with the CMIPv6 stack moves from a PMIPv6 domain to another domain or to another domain where the network-based local mobility management is not supported, it must transmit global registration to one or more HAs and/or CNs. Such global registration may have to be carried out when MN having the CMIPv6 stack enters a PMIPv6 domain.

When MN is connected to a PMIPv6 domain, MN provides NAI (Network Access Identifier) while it is connected with MAG (Mobile Access Gateway). MAG is a router which carries out proxy local registration on behalf of a mobile terminal (including IPv6 host; hereinafter referred as "MN"), and which is directly connected to MAG or under the management of MAG.

NAI is delivered to an AAA server (Authentication, Authorization and Accounting server) for the purpose of authentication. The AAA server (a local server (LS)) sends a reply to notify the success of authentication to MAG when it authenticates the network connection of MN, and it provides local PMIPv6 domain parameters of the home link or MN. These parameters include: a prefix unique to each MN, an address of LMA, a moving policy of MN, address arrangement of mode (stateless or stateful), ability of MN (ability for IPv6, MIPv6-mounted, etc.). When MAG acquires the parameters of MN as such, it emulates a home link and/or a local home link and transmits a proxy BU (PBU: Proxy BU) to LMA at the same time.

The PBU or the local registration to be carried out by MAG is the same as the BU of MIPv6 except the setting of detailed parameters such as the setting of a flag to indicate that the processing is a proxy BU. By carrying out the PBU, a reachable state to MN is created at LMA. Basically, LMA can reach the prefix of MN as acquired in the PMIPv6 domain, and a reachable address to the prefix is the address of MAG. Specifically, LMA has a type of information, where the prefix of MN is associated with the address of MAG to which MN is connected. MN configures an address by using a prefix received in the PMIPv6 domain in stateless or stateful address arrangement mode. Because each MN acquires a unique prefix, the reachability to MN can be sufficiently accomplished at a prefix-based cache of LMA.

All data packets reaching LMA are tunneled to MAG where MN is connected. The same also applies in reverse direction, and data packets transmitted from MN are tunneled to LMA from MAG. In the neighbor cache table of MAG, a PMIPv6 local address of MN and a binding with the link layer address are included, and these are referred when the packets are transmitted to MN.

A mobile node of multi-homing in wider sense is an MN, which has a plurality of interfaces (each of the interfaces may have different access technique), or an MN, which has an interface able to configure different addresses on the same interface. For instance, advantages of a multi-home host with various types of scenarios are described in the Non-Patent Document 4 as given below, and it can be foreseen that MN can have a plurality of interfaces or can have the function to process a plurality of prefixes later. However, the PMIPv 6 described in the Non-Patent Document 2 is designed by taking a mobile node having a single interface into account, and this PMIPv6 lacks the function of multi-homing support.

Also, the Non-Patent Document 7 as given below discloses a method to provide a multi-homing supporting function to a home agent when a node of CMIPv6 moves to a foreign domain. The multi-homing support function as disclosed in the Non-Patent Document 7 is a mechanism, by which the packets of MN can reach via different care-of addresses associated with one or more MN interfaces to carry out the advantages of multi-homing. When MN moves to a foreign domain of CMIPv6, a home agent that is a logical anchor point of home prefix of MN, must maintain binding information relating to the care-of address of MN for executing the multi-homing. The binding information as given above is a type of information, which is useful to perform mapping of various care-of addresses relating to one or more MN interfaces to the home address.

In order to maintain different types of binding at the same time, a BID (Binding Identifier Number) is used as described in the Non-Patent Document 7. The BID as given above is a type of identification information to uniquely identify an interface or the care-of address relating to the interface. BID is generated by a moving MN, and it is transferred to HA at the time of binding registration. By using BID, HA can maintain the registration to accomplish the reachability via different care-of addresses to a single home address. In general, this type of mechanism is called a multi-homing support mechanism. In the current PMIPv6, no consideration is given on the realization of this multi-homing support mechanism.

In the 3rd generation partnership project (3GPP), it is tried to accomplish global different types of network architecture set up by different types of radio access networks such as WLAN (Wireless Local Area Network), cellular network (3G network), WiMAX type wireless wide area network WWLAN (Wireless Wide Area Network), etc. This global different types of network architecture is used when seamless mobility should be realized or to support different types of application services such as real time video, VoIP, transmission of important data, etc.) under the condition of high QoS (Quality of Service).

In the Non-Patent Document 6 as given below, it is described that the possibility is high to adopt PMIPv6 as a local mobility management protocol of the 3GPP local domain. The 3GPP local area is set up by 3G cellular access network or by a trusted (reliable) WLAN or non-trusted (non-reliable) WLAN, etc. Further, there may be a case where an MN having a plurality of different types of interfaces moves in the 3GPP network as described above and simultaneous connections by different types of interfaces are required to attain multi-homing effect. Therefore, it appears that PMIPv6 provided in 3GPP must be able to carry out some kind of multi-homing support.

The Non-Patent Document 5 as given below describes various problems which may arise when MIPv6 and PMIPv6 perform interaction with each other. In this document, description is primarily given on the problems relating to an MN, which is mounted with CMIPv6 stack and is subscribed in PMIPv6 service. In the Non-Patent Document 2 and the Non-Patent Document 5, it is described that LMA further has HA function. In LMA of such dual mode, the function of LMA of PMIPv6 and the function of HA of MIPv6 are fulfilled by a single communication device, and this is referred as a concurrently provided LMA/HA (referred as "LMA/HA" in the present specification).

LMA/HA fulfills the function as a PMIPv6 home LMA to a node, which has a home address, configured from the prefix of LMA (a prefix belonging to the control of LMA and being unique to each MN). Also, LMA/HA fulfills the function as a foreign LMA to a node which has a home address not using the prefix of LMA and which has moved to PMIPv6 from outside. Further, LMA/HA fulfills the function as HA of MIPv6 to a node which is moving to other domain, and can carry out position management (management of care-of address) of this node. Also, when LMA/HA is a home agent of a specific node and this node starts to move in a PMIPv6 domain, which is a home domain, LMA/HA fulfills the function as a home LMA. In this case, position registration signaling is carried out at LMA/HA. When the MN as given above moves to another foreign domain, the same LMA/HA fulfills the function as HA of MIPv6, and receives the registration of MIPv6 from MN directly.

In general, as disclosed in the Non-Patent Document 2 or in the Non-Patent Document 5, for an MN which has only one interface and which is associating one address with this interface, only one cache entry can be used at LMA/HA. With regard to the MN which has only one interface, it is necessary to arrange that only one cache entry can be registered to one MN to connect either one of arbitrary connection points of a home PMIPv6 domain, a foreign domain, or a home link, and LMA/HA should have only one cache to a certain MN.

Further, the Patent Document 1 as given below discloses a method to offer a local area mobility management of network via a network access router in the domain to the MN in moving (mounted with MIPv6 stack). In this case, an anchor to carry out the local mobility management is called a mobility anchor (MA), and its prefix is notified from an access router. As a result, MN can configure a care-of address and can register MIPv6 to HA or CN.

In the Patent Document 2 as given below, a technique is disclosed, according to which MA can resolve a race condition by using a sequence number in the registration of MIPv6 in the local mobility management domain. Further, the Patent Document 2 as given below discloses information to notify two prefixes to MN. In this case, one of the two prefixes is a local prefix (e.g. it is a prefix to be notified from AR (access router), i.e. address of AR), and the other is an address of a mobility agent (MA). A local network segment where MN receives MA address is called a local mobility domain. MN configures two care-of addresses.

The address as configured by MN from a prefix related to AR is called a local address, and an address configured from the prefix of MA is called a global address. Each time the sub-network is changed in the local domain, MN configures a local care-of address and notifies this local address to MA. Also, only in case the mobility agent has been changed, MN configures a global address and notifies it to HA or CN. A binding to be notified to HA or CN is a binding, which associates the home address of MN with the global address of MN.

[Non-Patent Document 1] Johnson, D. B., Perkins, C. E., and Arkko, J.: "Mobility Support in IPv6"; Internet Engineering Task Force Request for Comments 3775; June 2004.

[Non-Patent Document 2] Gundavelli, S., et al.: "Proxy Mobile IPv6"; Internet Engineering Task Force (IETF) Working Group Draft: draft-sgundave-mip6-proxymip6-02.txt; Mar. 5, 2007.

[Non-Patent Document 3] Damic, D, et al.: "Proxy Mobile IPv6 Indication and Discovery"; Internet Engineering Task Force (IETF) Working Group Draft: draft-damic-netlmm-pmip6-ind-discover-01.txt; Jun. 19, 2007.

[Non-Patent Document 4] Ernst, T., et al.: "Motivations and Scenarios for Using Multiple Interfaces and Global Addresses"; Internet Engineering Task Force (IETF) Working Group Draft: draft-ietf-monami6-multihoming-motivation-secenario-02.txt; Jul. 12, 2007.

[Non-Patent Document 5] Giaretta, G., et al.: "Interactions between PMIPv6 and MIPv6: scenarios and related issues"; Internet Engineering Task Force (IETF) Working Group Draft: draft-giaretta-netlmm-mip-interactions-01; Jul. 6, 2007.

[Non-Patent Document 6] "3GPP System Architecture Evolution: Report on Technical Options and Conclusion"; 3GPP TR 23.882, V 1.9.0; April 2007.

[Non-Patent Document 7] Wakikawa, R., et al.: "Multiple Care-of Addresses Registration"; Internet Engineering Task Force (IETF) Working Group Draft: draft-ietf-monami6-multiplecoa-03.txt; Jul. 9, 2007.

[Patent Document 1] international Patent Publication Application No. WO-03-107600.

[Patent Document 2] U.S. Pat. No. 6,992,995.

However, problems may arise because PMIPv6 does not support multi-homing and LMA/HA can maintain only one cache entry relating to a certain MN. Even when it is so designed that PMIPv6 can formally support multi-homing, problems may arise. In the following, description will be give on these problems:

In FIG. 1A, MN 10 has two interfaces having different types of access technique. MN 10 is first connected to a home PMIPv6 domain 100, which is a home domain, and it is connected to a global Internet 102 via this home PMIPv6 domain. It is supposed here that one of the interfaces moves from the home PMIPv6 domain to a foreign domain after time elapses, while the other of the interfaces is still connected to the home PMIPv6 domain. One of the interfaces of MN 10 is an interface of a type using WLAN access technique, while the other of the interfaces is an interface of 3G type. Although not shown in the figure, there may be a case where the home PMIPv6 domain 100 and the WLAN access network (foreign domain 101) are connected without passing through the global Internet 102 (e.g. in case connection is made via a node such as LMA, MAG, etc.)

It is also supposed here that MN 10 is provided with CMIPv6 stack. Further, it is supposed that the 3G interface is directly connected to MAG 20 via a radio link 11 and that the WLAN interface is directly connected to MAG 21 via a radio link 12. Also, it is supposed that the WLAN interface is connected to a WLAN, which is a non-trusted (non-reliable) WLAN as seen from 3G network as described in the Non-Patent Document 6. It can be considered that the function of MAG is provided to AR in a trusted (reliable) WLAN.

The prefix which is received by MN 10 after it is connected to this PMIPv6 domain via one of a plurality of interfaces, is a home prefix, and the PMIPv6 domain 100 may be described as a home PMIPv6 domain. This home prefix may be set up in advance at MN 10, or may be acquired from a DHCPv6 server (not shown) or from an AAA server 30 during boot strapping.

Therefore, when MN 10 receives the home prefix by RA (Router Advertisement) after receiving a layer 2 authentication, it can be promptly identified that this is the home network. In this case, MN 10 does not carry out mobility-related position update signaling between LMA/HA 40 and itself.

Further, it is supposed here that MN 10 is first connected to MAG 20 via the 3G interface. In this case, MN 10 receives a home prefix via the 3G interface by RA signaling as described above. MN 10 configures an address in the 3G interface by using stateful or stateless address arrangement mode.

MN 10 may use the address as configured for the 3G interface as a home address of MIPv6 in both of the interfaces. In the following, it is supposed that MN 10 uses the address as configured for the 3G interface as a home address of MIPv6 in both of the interfaces. Because the DHCPv6 server offers the same address to both of the interfaces according to NAI and prefix information, the same address may be configured for both of the interfaces when stateless address configuration is carried out.

When parameters of MN 10 are acquired from a local AAA 30, MAG 20 issues a proxy BU 60 to LMA/HA 40. A binding cache (BC) entry created by a proxy registration (PBU) 60 is a first entry of BC 50 as shown in FIG. 1B, for instance. Description will be given now by using a binding cache with such arrangement, while actual way of management is diverse as to how these entries are managed. For instance, entities to fulfill the functions of LMA and HA are installed separately, and these binding caches are placed under management separately for PMIP and for CMIP, and associated processing is performed between entities having the functions of LMA and HA while notifying to each other.

Further, it is supposed here that the home PMIPv6 domain 100 has a function to perform multi-homing support. This multi-homing support function means that LMA/HA can maintain simultaneous connection binding by using an interface identifier (IF-ID) or BID similarly to the case as disclosed in the Non-Patent Document 7. Further, it is necessary to create a plurality of bindings relating to the same prefix of MN 10, and LMA/HA 40 must be able to discriminate simultaneous connection by the same MN 10 by using another parameter such as BID, for instance, to create a plurality of bindings relating to the same prefix by PBU transmitted to each of the two interfaces of MN 10.

It is supposed here that each of the interfaces of MN 10 can acquire only one prefix (a prefix managed by LMA/HA 40 and being specific to MN 10). Therefore, it is possible to discriminate the bindings by the same MN which is making connection via different interfaces by using an interface ID such as MAC (Media Access Control) address, BID, etc.

Also, when a plurality of prefixes are notified and are processed by one interface, the use of BID would be more appropriate when a plurality of bindings are discriminated by LMA/HA 40. In FIG. 1A, it is supposed that BID information is included in PBU 60. This BID is offered by MN 10 or AAA 30, or it is generated by MAG 20. There are many methods to generate BID, and any method as desired may be used.

When the first entry of BC 50 is checked, it is seen that a reachable condition relating to the home prefix of MN 10 is associated with the address of MAG 20 (i.e. MAG 20.CoA). This address of MAG 20 is a care-of address of the 3G interface of MN 10 or it is a proxy care-of address of the 3G interface of MN 10.

Because PBU 60 is based on PMIPv6 registration and no sequence number is used on PBU, no entry is present in the field of the sequence number (N/A). Also, PBU has a time stamp option field, and time information included in the time stamp option of PBU 60 is stored in the binding entry relating to PBU 60.

Further, it is supposed that, subsequent to the connection of 3G interface, connection is made to MAG 21 via the WLAN interface of MN 10. After L2 authentication has been successfully performed, the WLAN interface receives the same home prefix as a prefix as seen from the 3G interface. When notification of the successful authentication is received from AAA 30, PBU 61 is sent to LMA/HA 40.

After being connected to MAG 21 only for a short time, the WLAN interface of MN 10 promptly moves and is connected to a foreign domain 101. This foreign domain 101 is also connected to the global Internet 102. The foreign domain 101 may be another 3GPP domain or a different access network such as WiMAX, WLAN, etc. or may be a network where a radio system and a fixed system are coordinated by means such as FMC (Fixed Mobil Convergence) or a network relating to a network arrangement under management of higher order such as NGN (next Generation Network), or the reliability with these networks may be high or low. Further, the home PMIPv6 domain 100 and the access network of WLAN (foreign domain 101) may be connected together without passing the global Internet 102 (e.g. connection may be made via a node such as LMA, MAG, etc.). There are essential problems despite of the difference in the network arrangement, and description will be given below in the present specification by taking an example on an arrangement of FIG. 1A.

In the connection to the foreign domain 101, it is supposed here that the WLAN interface makes connection to AR 22 via a radio link 13. Quick change of connection of the WLAN interface of MN 10 is schematically shown by an arrow mark 14 in FIG. 1A. MN 10 may receive a nomadic prefix from AR 22. After receiving this prefix, MN 10 configures a care-of address and carries out MIPv6 BU 62 to LMA/HA 40.

It is assumed here that this BU registration 62 reaches LMA/HA earlier than PBU 61 from MAG 21 (i.e. PBU relating to the connection before the switch of the interfaces). In this case, a phenomenon normally called a race condition (a competitive condition) occurs because the connection to MAG 21 has lasted only for a very short time. Also, a race condition may occur when PBU 61 arrives later than BU 62 of MIPv6 (CMIPv6) due to congestion of the packets in the home PMIPv6 domain.

When MIPv6 BU 62 reaches LMA/HA 40 earlier, registration of MIPv6 is prepared at LMA/HA 40. For instance, it is supposed here that PMIPv6 and CMIPv6 caches are placed under management in a space of one cache or one address at LMA/HA 40, LMA/HA can identify the difference of caches of PMIPv6 and CMIPv6 of a specific interface of MN 10 by using NAI, for instance. Also, in the second entry of BC 50, a CMIPv6 cache is present. At BC 50, the interfaces can be uniquely identified depending on the field of IF-ID/BID.

For a CMIPv6 binding, a sequence number included in the BU message is stored at the entry of the sequence number (Seq#). In the CMIPv6 binding, there is no information, which should be placed in the time stamp field. After the elapse of a short time, an older PBU 61 as forwarded from MAG 21 may reach LMA/HA 40. In this case, only one binding to assign either one of PMIPv6 or CMIPv6 to a certain interface as described above is maintained, and a correct CMIPv6 binding of BC 50 may be overwritten by an older PBU 61 from MAG 21. This is represented by the erasing of the second entry of BC 50 in FIG. 1B.

The erroneous entry as set up above may receive proxy registration deletion from MAG 21, or MN 10 may be kept in a condition usable by LMA/HA 40 until the binding refresh BU reaches from the WLAN interface. Until the erroneous entry will be deleted, all packets to be transmitted and received at the WLAN interface will be lost. As a result, the network cannot offer services such as load balance, fault tolerance, bi-casting, etc. (services based on the multi-homing function), and it is not possible to receive the benefit of multi-homing.

In general, the problem that the current CMIPv6 cache is overwritten by older PMIPv6 registration is called PMIP/CMIP race condition. Those skilled in the art would easily understand that similar problem may occur when the WLAN interface of MN 10 is first connected to a foreign domain and it goes back to the home PMIPv6. In such case, the older CMIPv6 cache may be registered instead of the current PMIPv6 cache.

According to the technique disclosed in the Patent Document 1, when MN moves in a local mobility management domain, an access router fulfills the function as a proxy of MN and carries out local position registration signaling of MN to MA. This signaling method is the same type of the method as the method of HMIPv6 or MIPv6.

According to the technique disclosed in the Patent Document 2, MA is not a home agent of MN but it is a mere mobility agent. Therefore, as explained in connection with FIG. 1A and FIG. 1B, no race condition occurs where CMIPv6 binding is overwritten by the PMIPv6 binding. When MN moves from the local mobility management domain to the other domain, old local registration in the old domain (i.e. the domain before the moving) is deleted, and management of a new local registration is executed in the new domain. Therefore, according to the technique disclosed in the Patent Document 2, there is no possibility to cause a race condition between a PMIPv6 binding in the PMIPv6 domain and a CMIPv6 binding in the CMIPv6 domain.

In the technique disclosed in the Patent Document 2, MN carries out local registration to MA. However, the race problem in the local mobility management signaling of the local domain can be solved by using a sequence number just as in the case of MIPv6. In the technique disclosed in the Patent Document 2, MA is a mere local mobility management anchor and it is not a home agent. Accordingly, when MN moves from a local domain, new registration of MN is not notified to MA of the local domain, to which it has been connected before the moving. Therefore, there is no possibility to cause a race condition where the CMIPv6 binding is overwritten by the PMIPv6 binding as explained in connection with FIG. 1A and FIG. 1B. Thus, the technique disclosed in the Patent Document 2 cannot solve the problem relating to the present invention.

DISCLOSURE OF THE INVENTION

To solve the above problems, it is an object of the present invention to provide a mobile terminal, a network node, and a packet transfer management node, by which it is possible to resolve a race condition between a PMIPv6 binding by a PBU message of PMIPv6 and a CMIPv6 binding by a BU message of CMIPv6.

To attain the above object, the present invention provides a mobile terminal, which comprises:
 a plurality of radio communication interfaces;
 a mobile IP module to fulfill a mobile IP function; and
 identification information transmitting means for transmitting identification information to identify a binding update message transmitted from a first radio communication interface among said plurality of radio communication interfaces or a binding update message to be transmitted from a first radio communication interface among said plurality of radio communication interfaces, said identification information to be transmitted from a second radio communication interface connected to a home domain where a network-based local mobility management protocol is provided among said plurality of radio communication interfaces.

With the arrangement as described above, it is possible to resolve a race condition between a PMIPv6 binding by a PBU message of PMIPv6 and a CMIPv6 binding by a BU message of CMIPv6.

Also, in addition to the arrangement as described above, the present invention provides the mobile terminal as described above, wherein it is so arranged that, when the identification information of said binding update message is to be notified to a network node where said second radio communication interface is connected, a request is made to said network node to notify a packet transfer management node in said home domain by adding current time information to said identification information.

With the arrangement as described above, the mobile terminal can request MAG to add time information.

Further, in addition to the arrangement as described above, the present invention provides the mobile terminal as described above, wherein said network node where said second radio communication interface is connected has a function to add time information, based on said identification of said binding update message, to said current time information in response to said request, and said network node makes a request when said network node has the function to add the time information.

With the arrangement as described above, it is possible to identify the function of MAG and to decide whether request should be made or not.

Also, in addition to the arrangement as described above, the present invention provides the mobile terminal as described above, wherein interface identification information to identify said first radio communication interface, address identification information to identify an address to be set on said first radio communication interface, and a sequence number included in said binding update message are used as said identification information.

With the arrangement as described above, it is possible to definitely identify a binding update message (i.e. binding information).

Further, in addition to the arrangement as described above, the present invention provides the mobile terminal as described above, wherein said binding update message is used as said identification information.

With the arrangement as described above, it is possible to transmit a binding update message as identification information from the other radio communication interface as it is.

Also, in addition to the arrangement as described above, the present invention provides the mobile terminal as described above, wherein it is so arranged that the identification information of said binding update message is transmitted from said second radio communication interface in case said first radio communication interface changes connection destination from said home domain to another domain and has transmitted or is going to transmit said binding update message from said first radio communication interface.

With the arrangement as described above, it is possible to resolve a race condition caused by the change of connection from a home domain to the other domain at adequate timing.

Further, in addition to the arrangement as described above, the present invention provides the mobile terminal as described above, wherein said identification information transmitting means is so arranged that a type of information to indicate that the binding information of said binding update message to be identified by said identification information is the newest information; and a packet transfer management node in said home domain can identify that said binding information is valid by receiving the information to indicate that said binding information is the newest, together with said identification information.

With the arrangement as described above, a packet transfer management node in a home domain can easily comprehend that the binding information should be validated.

Also, in addition to the arrangement as described above, the present invention provides the mobile terminal as described above, wherein it is so arranged that, in case said first radio communication interface changes connection destination from another domain to said home domain, said first radio communication interface transmits identification information of said binding update message transmitted when said first radio communication interface was connected to said another domain.

With the arrangement as described above, it is possible to resolve a race condition caused by the change of connection from the other domain to the home domain at adequate timing.

Further, in addition to the arrangement as described above, the present invention provides the mobile terminal as described above, wherein it is so arranged that said identification information transmitting means transmits, together with identification information of said binding update message, a type of information to indicate that the binding information of said binding update message to be identified by said identification information is not the newest information; and it is possible to identify that said binding information is invalid when the packet transfer management node in said home domain receives, together with said identification information, a type of information to indicate that said binding information is not the newest information.

With the arrangement as described above, the packet transfer management node in the home domain can easily identify that the binding information should be invalidated.

Also, in addition to the arrangement as described above, the present invention provides the mobile terminal as described above, wherein it is so arranged that said mobile terminal itself carries out a client type mobility management protocol to perform processing relating to the mobility management.

With the arrangement as described above, it is possible to resolve a race condition caused by the change of connection between a domain to operate a client type mobility management protocol and a home domain provided with a network-based mobility management protocol.

Further, in addition to the arrangement as described above, the present invention provides the mobile terminal as described above, wherein there is provided current time acquiring means for acquiring the current time information from said home domain at the time when said identification information is transmitted by said identification information transmitting means; and said identification information transmitting means transmits said current time information together with the identification information of said binding update message.

With the arrangement as described above, the mobile terminal can add the current time information synchronized with the time of the home domain to identification information of the binding update message.

Also, to attain the above object, the present invention provides a network node, being present in a network domain where a network-based mobility management protocol is carried out, and being able to be a connection point to said network domain with respect to a mobile terminal having said network domain as a home domain, wherein:

said mobile terminal adds time information to a packet received from said mobile terminal, said packet including a packet containing identification information of the binding update message transmitted from another radio communication interface, or identification information of the binding update message to be transmitted subsequently, and said mobile terminal transmits the packet to a packet transfer management node in said network domain.

With the arrangement as described above, it is possible to resolve a race condition between a PMIPv6 binding by a PBU message of PMIPv6 and a CMIPv6 binding by a BU message of CMIPv6.

Further, the present invention provides the network node as described above, wherein it is so arranged that, when it is requested from said mobile terminal to add said time information, said packet is transmitted to said packet transfer management node by adding said time information to a packet received from said mobile terminal.

With the arrangement as described above, it is possible to record the time of transmission of identification information of the binding update message according to a clock on the network side.

Also, in addition to the arrangement as described above, the present invention provides the network node as described above, wherein a request is made from said mobile terminal to add said time information to a specific packet where a binding update message transmitted from another radio communication interface or identification information of a binding update message to be transmitted from now on is included.

With the arrangement as described above, it is possible to add time information upon request from the mobile terminal.

Further, in addition to the arrangement as described above, the present invention provides the network node as described above, wherein, when said mobile terminal detects identification information of a binding update message transmitted form another radio communication interface or identification information of a binding update message to be transmitted from now on, and said packet is transmitted to said packet transfer management node by adding the time information to said packet.

With the arrangement as described above, MAG can add time information by detecting identification information of the binding update message by itself.

Also, in addition to the arrangement as described above, the present invention provides the network node as described above, wherein a fact that a function is provided to transmit to said packet transfer management node by adding said time information is passively notified to said mobile terminal when an inquiry is received from said mobile terminal, or even in case where no inquiry is received from said mobile terminal, notification is actively made to said mobile terminal, With the arrangement as described above, it is possible to notify the function of MAG to add time information to the mobile terminal.

Further, to attain the object as described above, the present invention provides a packet transfer management node, being present in a network domain where a network-based mobility management protocol is carried out, and used for managing packet transfer within said network domain, wherein said packet transfer management node comprises:

a home agent realizing means for realizing a function as a mobile IP home agent;

mobile IP binding information storage means for storing binding information of a node to be managed by said home agent realizing means;

communication means for performing communication with a local management node, having local mobility anchor realizing means for realizing a function as a local mobility anchor of said network-based mobility management protocol, and having local binding information storage means for storing binding information of a node to manage by said local mobility anchor realizing means; and binding information processing means for receiving said identification information and said time information from said local management node via said communication means, identifying a binding in said mobile IP binding information storage means based on said identification information, and associating said identified binding information with said time information, in case identification information of a binding update message transmitted by said mobile terminal via another radio communication interface, or identification information of a binding update message to be transmitted from now on and time information added are received by said local management node from a network node in said network domain and being able to be a connection point to said home domain with respect to a mobile terminal, having said network domain as a home domain.

With the arrangement as described above, it is possible to resolve a race condition between a PMIPv6 binding by a PBU message of PMIPv6 and a CMIPv6 binding by a BU message of CMIPv6.

Also, to attain the object as described above, the present invention provides a packet transfer management node, being present in a network domain where a network-based mobility management protocol is carried out, and used for managing packet transfer within said network domain, wherein said packet transfer management node comprises:

local mobility anchor realizing means for realizing a function as a local mobility anchor of said network-based mobility management protocol;

local binding information storage means for storing binding information of a node to be managed by said local mobility anchor realizing means;

communication means for performing communication with a global management node, having home agent realizing means for realizing a function as a mobile IP home agent, and mobile IP binding information storage means for storing binding information of a node to be managed by said home agent realizing means; and binding information processing means for identifying a binding in said mobile IP binding information storage means based on said identification information, and associating said identified binding information with said time information by delivering said identification information and said time information to said global management node via said communication means in case identification information of a binding update message transmitted by said mobile terminal via another radio communication interface, or identification information of a binding update message to be transmitted from now on and time information added are received by said local management node from a network node in said network domain and being able to be a connection point to said home domain with respect to a mobile terminal, having said network domain as a home domain.

With the arrangement as described above, it is possible to resolve a race condition between a PMIPv6 binding by a PBU message of PMIPv6 and a CMIPv6 binding by a BU message of CMIPv6.

Further, to attain the object as described above, the present invention provides a packet transfer management node, being present in a network domain where a network-based mobility management protocol is carried out, and used for managing packet transfer within said network domain, wherein said packet transfer management node comprises:

home agent realizing means for fulfilling a function as a mobile IP home agent;

local mobility anchor realizing means for fulfilling a function as a local mobility anchor of said network-based mobility management protocol;

binding information storage means for storing binding information of a node managed by said home agent realizing means and said local mobility anchor realizing means; and binding information processing means for identifying a binding in said binding information storage means based on said identification information, and associating said identified binding information with said time information and said local management node identifies a binding in said mobile IP binding information storage means based on said identification information, and associates said identified binding information with said time information in case identification information of a binding update message transmitted by said mobile terminal via another radio communication interface, or identification information of a binding update message to be transmitted from now on and time information added are received by said local management node from a network node in said network domain and being able to be a connection point to said home domain with respect to a mobile terminal, having said network domain as a home domain.

With the arrangement as described above, it is possible to resolve a race condition between a PMIPv6 binding by a PBU message of PMIPv6 and a CMIPv6 binding by a BU message of CMIPv6.

Also, in addition to the arrangement as described above, the present invention provides a packet transfer management node as described above, wherein it is checked whether or not there is other binding information relating to said radio communication interface where said binding information to be identified by said identification information received is set up within said mobile IP binding information storage means and said local binding information storage means or within said binding information storage means, and in case said other binding information is present, time information of each binding information is checked, and the binding information having time information to indicate the newest time is set as valid binding information.

With the arrangement as described above, it is possible to decide which of PMIPv6 binding or CMIPv6 binding information is newer, and to set up a newer type of binding information as valid binding information.

Further, in addition to the arrangement as described above, the present invention provides a packet transfer management node as described above, wherein, in case unnecessary binding information is present in said mobile IP binding information storage means and said local binding information storage means or in said binding information storage means, it is so arranged that said unnecessary binding information is left in invalid state.

With the arrangement as described above, it is possible to leave unnecessary binding information without completely erasing it.

Also, in addition to the arrangement as described above, the present invention provides a packet transfer management node as described above, wherein, in case unnecessary binding information is present in said binding information storage means, said unnecessary binding information is left in invalid state, and in case the binding information having time information to indicate the latest time is set in invalid state, the binding information set in invalid state is to be set as valid binding information.

With the arrangement as described above, it is possible to leave unnecessary binding information unchanged without erasing it completely and to set it as valid binding information again when necessary.

Further, in addition to the arrangement as described above, the present invention provides a packet transfer management node as described above, wherein it is so arranged to delete said unnecessary binding information when a certain predetermined time period has elapsed with said unnecessary binding information set in invalid state.

With the arrangement as described above, the binding information can be deleted stepwise and efficiently by deleting unnecessary binding information which has been left unused in the once invalidated condition and left for a certain predetermined period of time.

Also, in addition to the arrangement as described above, the present invention provides a packet transfer management node as described above, wherein, in case the binding information relating to said binding update message is not present in said binding information storage means although the time information to indicate the latest time is said time information transmitted together with the identification information of said binding update message, it is so arranged that said binding update message is to be re-transmitted to said mobile terminal.

With the arrangement as described above, it is possible to promptly request the mobile terminal to send the information again in case binding information to be set up as valid binding information is not present in the binding cache.

Further, in addition to the arrangement as described above, the present invention provides a packet transfer management node as described above, wherein it is checked whether or not there is other binding information relating to said radio communication interface where said binding information to be identified by said identification information received is set up within said mobile IP binding information storage means and said local binding information storage means or within said binding information storage means, and in case said other binding information is binding information to be identified by the identification information being the same as or older than said identification information received, it is so arranged that said other binding information is made invalid.

With the arrangement as described above, it is possible to invalidate unnecessary binding information according to identification information (e.g. sequence number) of the binding update message.

Also, in addition to the arrangement as described above, the present invention provides a packet transfer management node as described above, wherein, in case a type of information to indicate that the binding information of said binding update message identified by said identification information is the newest information has been received together with identification information of said binding update message, it is so arranged that said binding information of said binding update message to be identified by said identification information is regarded as valid.

With the arrangement as described above, it is possible to easily comprehend that the binding information should be validated by referring to the information which indicates that the binding information of the binding update message is the newest one.

Further, in addition to the arrangement as described above, the present invention provides a packet transfer management node as described above, wherein, in case a type of information to indicate that the binding information of said binding update message identified by said identification information is not the newest information has been received together with identification information of said binding update message, it is so arranged that said binding information of said binding update message to be identified by said identification information is regarded as invalid.

With the arrangement as described above, it is possible to easily comprehend that the binding information should be invalidated by referring to the information which indicates that the binding information of the binding update message is not the newest one.

Also, in addition to the arrangement as described above, the present invention provides a packet transfer management node as described above, wherein, in case time interval between the receiving time of said binding information identified by said identification information and the receiving time of another binding information relating to said radio communication interface where said binding information identified by said received identification information is set is shorter than a predetermined time period, it is so arranged that said mobile terminal is requested to re-notify binding information relating to said radio communication interface.

With the arrangement as described above, it is possible to estimate the occurrence of a race condition when the binding information relating to the same radio communication interface is received continuously within a short time, and to make an inquiry to the mobile terminal.

Further, in addition to the arrangement as described above, the present invention provides a packet transfer management node as described above, wherein, in case a race condition of binding information is detected in the same radio communication interface, the fact that said race condition has been detected is notified to said mobile terminal, and another radio communication interface different from said radio communication interface where said race condition has been detected can be used temporarily.

With the arrangement as described above, even when the occurrence of a race condition is resolved with regard to the binding information relating to a specific radio communication interface, it is possible to continuously perform communication relating to this specific radio communication interface by using the other radio communication interface.

The present invention has the arrangements as described above and provides the effects to resolve a race condition between a PMIPv6 binding by a PBU message of PMIPv6 and a CMIPv6 binding by a BU message of CMIPv6. Also, the invention provides the effects to accomplish efficient operation when it is necessary to resolve a race condition between a CMIPv6 binding by a BU message of CMIPv6 and to decrease the load applied on the network and each communication node.

BRIEF DESCRIPTION OF THE DRAWINGS

FIG. 2A is a schematical drawing to show a system configuration to explain general features of a first embodiment of the invention;

FIG. 2B is a table to show an example of LMA/HA in the first embodiment of the invention;

FIG. 3B is a flow chart to show an example of operation of MN in the first embodiment of the invention;

FIG. 4B is a flowchart to show an example of operation of a BU race resolving module of LMA/HA in the first embodiment of the invention;

FIG. 5A is a schematical drawing of system configuration to explain general features when fault occurs in the first embodiment of the invention;

FIG. 5B is a table to show an example of BC of LMA/HA when fault occurs in the first embodiment of the invention;

BEST MODE FOR CARRYING OUT THE INVENTION

Figures 1A, 1B:
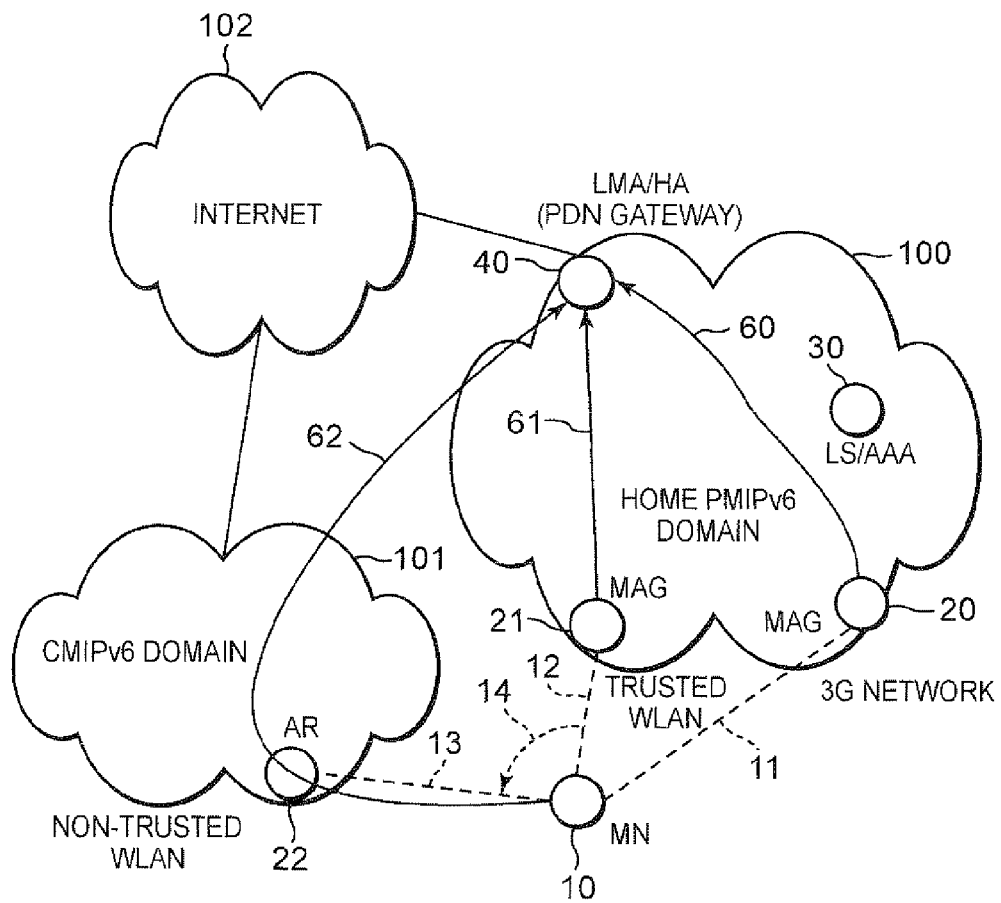
FIG. 1A is a schematical drawing of a system to explain the prior art.
FIG. 1B is a table to show an example of a BC (Binding Cache) of LMA/HA (Local Mobility Anchor/Home Agent) in the prior art.

In the present invention, for the purpose of solving the race problem between a BU (Binding Update) message of a home PMIPv6 (Proxy Mobile IPv6) and a BU of CMIPv6 (Client Type Mobile IPv6) to be carried out by MN (mobile terminal) which has a plurality of interfaces, MN notifies identification information of the BU message of the CMIPv6 transmitted via one of the interfaces (e.g. sequence number and/or BID value used in the BU message of CMIP) to MAG (Mobile Access Gateway) of the PMIPv6 domain connected via the other of the interfaces.

Also, according to the present invention, it is so arranged that, when MAG receives identification information of the BU message of the CMIPv6 (or the BU message itself) from MN, MAG creates a packet including the identification information of the BU message and MAG transmits a time stamp option including time information as acquired from its own clock by adding it to LMA/HA.

Further, according to the invention, when LMA/HA in the PMIPv6 domain receives a packet which contains identification information of the BU message of CMIPv6 transmitted by MN and which is further added with a time stamp option including time information, LMA/HA identifies the interface via which the BU message of CMIPv6 specified by the identification information included in the packet is transmitted, and retrieves whether the binding by PBU of PMIPv6 relating to this interface is maintained or not. If the binding by PBU of PMIPv6 relating to this interface is maintained, the time information included in this binding cache entry is compared with the time information included in the time stamp option of the received packet, and the new binding is made valid by the time information.

Description will be given below on embodiments of the invention.

The First Embodiment

First, description will be given on a first embodiment of the invention. Referring to FIG. 2A, description will be given on general features of the first embodiment of the invention. FIG.

2A is a schematical drawing to show system configuration to explain general features of the first embodiment of the invention.

In FIG. 2A, MN 200 has two interfaces (i.e. a 3G type interface and a WLAN type interface). MN 200 can have various types of interfaces, and the type of the interfaces is not limited to the 3G type and the WLAN type as given above.

It is supposed here that MN 200 is connected to MAG 220 in a home PMIPv6 domain 230 via the 3G interface. Also, it is supposed that the WLAN interface of MN 200 has been connected to MAG 221 in the home PMIPv6 domain 230, but it has roamed to a foreign domain (a foreign CMIPv6 domain) 231, which is a CMIPv6 domain.

The foreign domain 231 may be a foreign PMIPv6 domain (a PMIPv6 management domain different from the home PMIPv6 domain 230) or it may be a non-trusted (non-reliable) domain. The home PMIPv6 domain 230 and the foreign domain 231 are connected with each other via a global Internet 232.

As described above, when transition between different types of IP (i.e. from the home PMIPv6 to the foreign CMIPv6) is executed via the WLAN interface of MN 200, a race condition of the binding update message may occur. To solve the race problems, when RA 261 is received from AR 222, MN 200 recognizes that the WLAN interface roams from the home network to the foreign network. In this case, MN 200 transmits the BU 262 of CMIPv6 to the home agent via its WLAN interface.

According to the present invention, when MN 200 identifies that the WLAN interface has roamed from the home PMIPv6 domain 230 to the foreign domain 231, MN 200 judges that a race condition may occur and requests MAG 220 to notify that the current connection via the WLAN interface is CMIPv6 connection to LMA/HA 250 by transmitting a message 263 to MAG 220. MN 200 has no need to wait for the transmission of the message 262 when the message 263 is to be transmitted, and it may transmit the message 262 after it has transmitted the message 263.

When MN 200 requests MAG 220 to notify that the current connection by the WLAN interface is a CMIPv6 connection, MN 200 delivers a sequence number of the BU message 262 of CMIPv6 to be sent via the WLAN interface to MAG 220 by using the message 263 together with an interface ID (IF-ID) or BID (Binding Identifier Number) of the WLAN interface connected to the CMIPv6 domain 231 by using the message 263.

This message 263 must contain the identification information to identify the BU message 262. Although the sequence number of the BU message 262 of CMIPv6 as transmitted via the WLAN interface and IF-ID/BID of the WLAN interface are used as the identification information of the BU message 262, for instance, the BU message 262 may be included in the message 263. Also, the identification information to identify MN 200 (e.g. NAI (Network Access Identifier)) may be included in the message 263.

The message 263 may be a new type of the ICMPv6 message including the identification information of the BU message 262, or it may be an L2 (Layer 2) message where the identification information of the BU message 262 is added. Also, the message 263 may be a Neigh Advertisement (NA) message where a new code value is used. Those skilled in the art would easily understand that there are many methods to deliver such important information parameters to MAG 220, and that the identification information of the BU message 262 can be delivered to MAG 220 by any arbitrary method.

Also, it is possible in the message 263 to explicitly request MAG 220 to notify that the current connection via the WLAN interface is a CMIPv6 connection to LMA/HA 250. For instance, MN 200 may request to add a time stamp option including the time information as to be described below by setting a specific flag on the message 263. In so doing, MAG 220 can add the time stamp option including time information only when the message 263 with such a flag is received, and this makes it possible to increase the efficiency of the processing by MAG 220.

MAG 220 may perform the operation according to the present invention (e.g. addition of the time stamp option including the time information) by detecting a packet including identification information of the BU message 262 by scrutinizing the packet. MAG 220 may wait until a message including the contents of the BU message to be transmitted via the 3G interface is detected, for instance, and may perform the operation according to the present invention to a message which has the contents of the detected BU message.

When this special message 263 is received, MAG 220 transmits a message 264 to LMA/HA 250. This message 264 may be a new type of the ICMPv6 message, or it may be a new of mobility message, or it may be a BU message of MIPv6 having new option, or may be a PBU message of PMIPv6 containing a new option.

Without depending on the type of the message 264, the current time information must be added to the message 264 by MAG 220 together with the identification information of the BU message 262 provided by the message 263 (i.e. the sequence number or IF-ID/BID of the BU message 262 of CMIPv6, or care-of address of the WLAN interface, NAI of MN 200, etc.). For instance, the time stamp option is added to the message 264, and the current time information is put into this time stamp option.

In case a data packet is transmitted via the 3G interface of MN 200, the parameters as given above, which constitutes the message 264, may be put in a tunnel header to be transmitted from MAG 220 to LMA/HA 250, and this tunnel header may be transmitted by adding it to the data packet.

The current time information to be added to the message 264 is obtained from a clock, which is incorporated in MAG 220. The time of this clock is synchronized with a common clock in the home PMIPv6 domain 230, or it is synchronized with a global time server by using NTP (Network Time Protocol).

FIG. 2B shows an example of a BC (Binding Cache) 260 of LMA/HA 250, including registration according to the first embodiment of the invention. First, PBU transmitted from MAG 220 reaches LMA/HA 250, and BCE (Binding Cache Entry) represented by the first entry of the BC 260 is created. This BCE is a genuine PMIPv6 binding, and HoA (home address) or prefix, CoA (Care-of address), IF-ID/BID, sequence number, and time stamp (time information) are included in it. Although the NAI field is not clearly indicated in the BC 260, LMA/HA 250 maintains NAI (Network Access Identifier) relating to the registration of PMIP binding and CMIP binding by associating with each BID.

Next, the BU message 262 of CMIPv6 is transmitted via the WLAN interface of MN 200, and BCE based on the registration of CMIPv6 represented by the second entry of the BC 260 is created. Basically, the time information is not included in the BU message of CMIPv6, and entry of the time stamp option is not created for the BU message 262.

When the message 264 reaches LMA/HA 250, LMA/HA 250 can confirm that the BU by the BU message 262 is valid, and the CMIPv6 entry (the second entry of BC 260) is marked as a valid entry. Further, the time information (a value in the time stamp option) received from the message 264 is added to BC 260.

As described above, LMA/HA 250 marks the CMIPv6 entry as a valid entry by using the sequence number of the BU message of CMIPv6 and the time stamp option received in the message 264. The value of the time stamp option indicates a time closer to the current time as given by the clock of LMA/HA 250, and the decision as described above can be made.

On the other hand, when a PBU message (an old PBU message relating to the connection before the change of connection of the WLAN interface) 265 reaches from MAG 221, LMA/HA 250 refers to the value of the time stamp option of the PBU message 265 and compares this with the value of the time stamp option as registered at the entry (the second entry of BC 260) of CMIPv6 in BC 260.

In case the value of the time stamp option of an older PBU message 265 from MAG 221 is older than the value of the time stamp of the current BU of CMIPv6 received via the same interface, LMA/HA 250 rejects the PBU message 265 (or simply discards it).

Although it is not shown in FIG. 2B, when the BU message 262 is received after receiving the PBU message 265 (or when the PBU message 265 is received after the BU message 262 has been received), LMA/HA 250 may overwrite the binding which has been already present at BC 260, by a binding which reached subsequently, or it may register the binding which reached subsequently and invalidate the binding already present, but it may not erase it promptly. In this case, a binding may be erased, for which invalid condition lasted for a certain predetermined time period or longer.

In the former case, when the message 265 reaches LMA/HA 250 at a time later than the message 262, at the time when the message 264 reached LMA/HA 250, the binding of CMIPv6 is not present at BC 260, and an older binding of PMIPv6 is registered at BC 260, while LMA/HA 250 may delete the older binding of PMIPv6 and may give a binding refresh request to urge to give the BU again to MN 200.

On the other hand, in the latter case, when the message 265 has reached LMA/HA 250 later than the message 262, for instance, it is possible to promptly register an adequate binding by switching over a valid binding which was valid at the time when the message 264 reached LMA/HA 250 so that the binding of CMIPv6 is turned to valid, which has been remaining in invalid condition.

Also, when the WLAN interface of MN 200 goes back again to the home PMIPv6 domain 230 immediately after it has been connected to a foreign domain only for a short time, the time stamp option used in the message 264 will be very useful. Even when MN 200 had made such connection change, another message with similar content (a message similar to the message 264) is transmitted via the 3G interface, and it is indicated that MN 200 has moved to the home PMIPv6 from CMIPv6.

However, when similar message as such reaches later than the previous message 264, and if the message 264 has no time stamp option, LMA/HA 250 cannot identify whether the PBU currently valid is really the newest binding relating to the WLAN interface or not. Those skilled in the art would easily understand that the time stamp option is important for solving the more difficult problem, which relates to a race condition. Also, those skilled in the art would easily understand that a problem relating to the race condition from PMIPv6 to CMIPv6 could be solved according to the present invention.

The first embodiment of the invention is advantageous in that MN 200 can promptly notify LMA/HA 250 about correct binding condition of the WLAN interface by using the sequence number to identify the binding of the BU message 262 of CMIPv6 transmitted via the WLAN interface.

MN 200 does not have to wait to make up the care-of address relating to the WLAN interface, and it notifies MAG 220 by using the message 263. If the care-of address of the WLAN interface is used for the purpose of identifying the BU message 262 of CMIPv6, MN 200 must wait until the processing on the address will be completed.

When the message 264 reaches LMA/HA 250 after the message 265, packet loss may occur because the binding prior to the change of connection of the WLAN interface may become temporarily valid in BC 260. However, when MN 200 notifies MAG 220 as quickly as possible after RA 261 has been received via the WLAN interface, the message 264 can reach LMA/HA 250 before the message 265 reaches LMA/HA 250, and it is possible to prevent the packet loss.

Also, according to the first embodiment of the invention, it is advantageous in that the information promptly reaches LMA/HA 250 because it is not always necessary to have authentication processing on LS/AAA 240 relating to MN 200, to set up tunnel between MAG 220 and LMA/HA 250, and to have PBU relating to MN 200 through notification of the connecting condition of the WLAN interface by using the 3G interface.

Because the connection to the home PMIPv6 domain 230 via the 3G interface of MN 200 is already established, the message 264 can quickly reach LMA/HA 250. According to the present invention, a request to MAG 220 of the message 263 or the like may not be an L3 message but may be an L2 message, and it is advantageous in that there is no need to use a large size signaling packet when the present invention is applied.

Further, in order to carry out the first embodiment of the invention, there is no need to estimate that the next connection is a connection of CMIPv6 and the foreign domain on the WLAN interface, and also, there is no need to acquire necessary parameters to solve the race problem. Further, according to the first embodiment of the invention, there is no need to have the time stamp option from MAG and there is no need to transmit and receive signaling to synchronize the clock with the home PMIPv6 domain 230, and also, there is no need to acquire the sequence number from MAG. Specifically, it is possible to arrange that the BU of the home PMIPv6 and the BU of CMIPv6 are adequately reflected under the condition that the load on the network is maintained at the minimum.

Also, MN 200 may transmit a message 263 including the identification information of the BU message 262 of CMIPv6 transmitted via the WLAN interface or may request the addition of the time stamp only after confirming whether the service according to the present invention has been offered to the home PMIPv6 domain 230 or not. Any method may be used when MN 200 confirms that the service according to the present invention is offered. For instance, MN 200 may make inquiry to the home PMIPv6 domain 230 or to the information server, or notification may be made explicitly on the fact that the service according to the present invention is offered by means of RA from the home PMIPv6 domain 230.

Figure 3A:
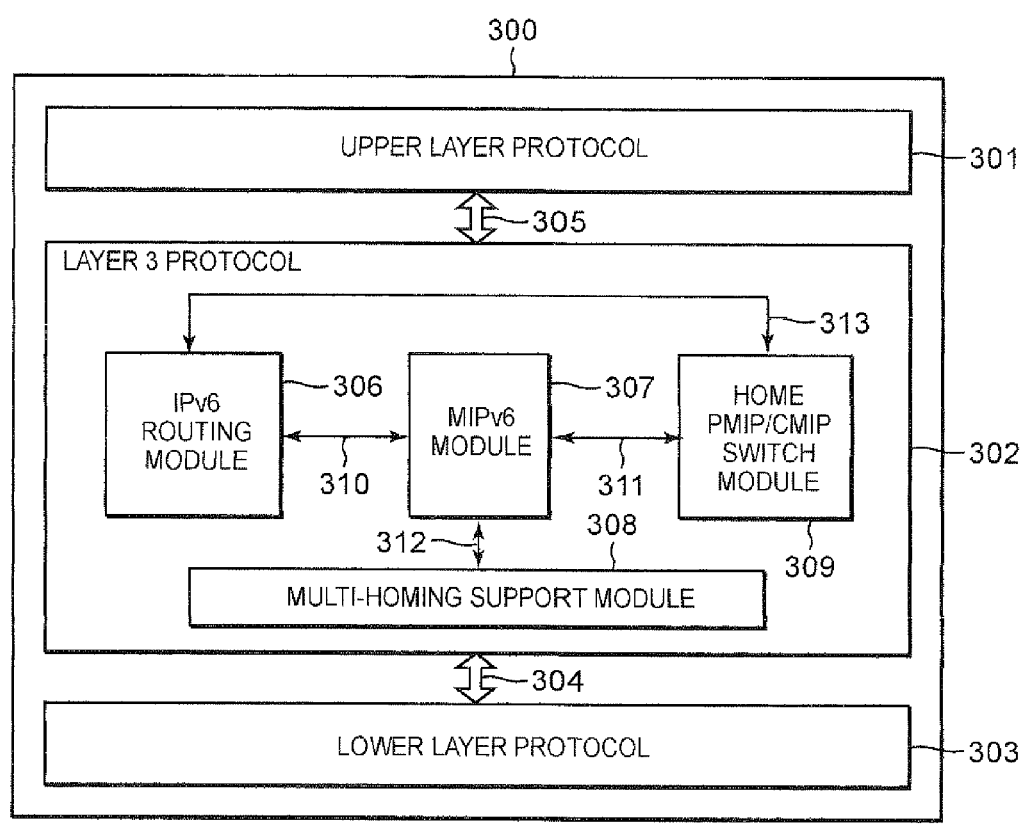
FIG. 3A is a block diagram to show an arrangement example of MN in the first embodiment of the invention.

Next, description will be given on functional architecture of MN to carry out the first embodiment of the invention. FIG. 3A is a schematical block diagram to show an arrangement example of MN in the first embodiment of the invention.

MN 200 has a multi-homing function and is provided with CMIPv6 stack. The multi-homing function means that MN 200 has an ability to generate BID when MN 200 is connected to a foreign domain and to carry out simultaneous registration binding relating to one or more interfaces and to the care-of address.

In the functional architecture of MN 300 as shown in FIG. 3A, it is represented that all types of software, hardware and firmware necessary to offer the IPv6-related protocol stack are provided to carry out the first embodiment of the invention. In FIG. 3A, MN 200 has an upper layer protocol 301, a layer 3 protocol 302 and a routing lower layer protocol 303.

In the lower layer protocol 303 shown in FIG. 3A, a plurality of lower layer protocol modules may be present. Specifically, there are one or more interfaces which MN 300 has, and functions in physical layer and data-link layer of each interface are included (the functions may differ according to each of the interfaces).

Also, an intermediate layer of MN 300 has all routing-related protocols, and this is represented by the layer 3 protocol 302 in FIG. 3A.

The upper layer protocol 301 shown in FIG. 3A has all transport and application layer protocols. The upper layer protocol 301 and the layer 3 protocol 302 give and take messages to and from each other via an interface 305. Also, the layer 3 protocol 302 and the lower layer protocol 303 give and take messages to and from each other via an interface 304.

In FIG. 3A, the layer 3 protocol 302 (i.e. a routing layer protocol) has an IPv6 routing module 306, an MIPv6 module 307, a multi-homing support module 308, and a home PMIP/CMIP switch module 309.

The IPv6 routing module 306 and the MIPv6 module 307 carry out interaction via an interface 310. Also, the MIPv6 module 307 and the multi-homing support module 308 carry out interaction via an interface 312. The MIPv6 module 307 and the home PMIP/CMIP switch module 309 perform interaction via an interface 311. Further, the IPv6 routing module 306 and the home PMIP/CMIP switch module 309 perform interaction via an interface 313.

The IPv6 routing module 306 has a function to receive and process an IPv6 packet of MN 300, a function to deliver the packet to the upper layer protocol 301 or to the lower layer protocol 303, a function to generate an IPv6 header and an extended header, a function to receive and process RA, a function to generate and process a neighbor advertisement message, a function of address arrangement, a function to generate and process an ICMPv6 message, a function to maintain a default router list, and other functions.

The MIPv6 module 307 has a function to generate a BU mobility header of MIPv6, a function to process acknowledgment relating to the binding registration, a function to generate and maintain a binding update list of the binding generated in relation to the registration of a plurality of care-of addresses, a function to add BID option to the BU messages, and other functions.

The IPv6 routing module 306 must perform interaction to and from the MIPv6 module 307 via the interface 310 in order to arrange a perfect BU message, which has an adequate extended header.

Further, a multi-home node can have a plurality of care-of addresses because the IPv6 routing module 306 must be check the validity of a plurality of destination addresses by performing interaction to and from the MIPv6 module 307 via the interface 310. The MIPv6 module 307 acquires BID by performing interaction to and from the multi-homing support module 308 via the interface 312 when the BU of MIPv6 having BID option is generated. The multi-homing support module 308 identifies the interfaces as required and the number of the interfaces required and the number of the care-of addresses according to information from the lower layer protocol 303.

Further, when the IPv6 routing module 306 receives a plurality of prefixes, this information is sent to the MIPv6 routing module 307 and is further delivered to the multi-homing support module 308. When the multi-homing support module 308 decides that a plurality of addresses are set to one interface, this decision is notified to the IPv6 routing module 306 via an adequate signaling by a software module.

The architecture of MN 300 in FIG. 3A is shown as a center module which is used by the MIPv6 module 307 to mediate information to other software module, while this is not an essential arrangement, and it would be possible to have an arbitrary arrangement conceivable by those skilled in the art.

By the multi-homing support module 308, it is decided to perform mapping of care-of address as to an upper layer flow.

Also, the MIPv6 module 307 performs interaction to and from the home PMIP/CMIP switch module 309. This home PMIP/CMIP switch module 309 has a function to detect that one of the interfaces of MN 300 has roamed from the home PMIPv6 domain to the foreign CMIPv6 domain.

When it is anticipated that a race condition may occur, the home PMIP/CMIP switch module 309 checks whether the other interface (an interface not changing the connection) is still connected to the home PMIPv6 domain or not. If the other interface is still connected to the home PMIPv6 domain, the home PMIP/CMIP switch module 309 sets up the message 263 as given above.

The home PMIPv6 domain information and the current foreign domain connection information relating to one of the interfaces of MN can be supplied to the home PMIP/CMIP switch module 309 from the IPv6 routing module 306 via an interface 313. By receiving the connection information, the home PMIP/CMIP switch module 309 can anticipate that a race condition may occur. In addition to the case where the possibility to generate a race condition is anticipated, in a case where the service at the home PMIPv6 domain is checked and it is confirmed that it is actually working, it may be so arranged that the home PMIP/CMIP switch module 309 adds the time stamp to MAG by sending a message corresponding to the above message 263.

The home PMIP/CMIP switch module 309 may have a timer by which it can be determined that an access router at an arbitrary interface has been changed promptly. Further, when the home PMIP/CMIP switch module 309 identifies that it is a home PMIP/CMIP switch, an adequate L2 (layer 2) message can be obtained by generating an ICMPv6 message which has a sequence number included in the BU message of CMIPv6 transmitted from a roaming interface together with BID of the roaming interface or by transmitting the sequence number as given above to the lower layer protocol 303. Then, the ICMPv6 message or the L2 message is transmitted to MAG of the home PMIPv6 domain as the message 263 as given above. The current sequence number used in the BU message of CMIPv6 and BID of the roaming interface can be acquired from the MIPv6 module 307 via an interface 311.

When the ICMPv6 message is used for notifying the BU message identification information such as the sequence number or BID to MAG just like the case of the message 263 of FIG. 2A, the home PMIP/CMIP switch module 309 may have a function to set up a perfect ICMPv6 message, or it may request the IPv6 routing module 306 via the interface 313 that this ICMPv6 message should be set up.

The home PMIP/CMIP switch module 309 may set up a message including a part (information element usable as identification information) or all of the BU messages of CMIPv6 (e.g. ICMPv6 message) as the message 263 of FIG. 2A.

The IPv6 routing module 306 must acquire information relating to a default router to be used in an arbitrary interface in order to forward a packet which corresponds to the message 263 of FIG. 2A. The IPv6 routing table may have a different default router to a different interface.

Next, description will be given on operation of MN to carry out the first embodiment of the invention. FIG. 3B is a flowchart to show an example of operation of MN in the first embodiment of the invention.

In FIG. 3B, MN first carries out the procedure of Step S314 and checks whether or not it has moved from the home PMIPv6 domain to a foreign CMIPv6 domain via one of a plurality of interfaces of MN. Further, MN checks whether at least one of the interfaces of MN is connected to the home PMIPv6 domain without roaming or not. MN has a function to detect whether it is connected to the home PMIPv6 domain via one of a plurality of interfaces or not.

In case some of the interfaces of MN has roamed from the home PMIPv6 domain to the foreign CMIPv6 domain and at least one of the interfaces of MN has not roamed and is connected to the home PMIPv6 domain without roaming (in case of "Yes" in Step S314), MN estimates that a race condition (a race condition between different types of PMIP/CMIP) may occur, and the processing of Step S315 is started.

In Step S315, MN configures a care-of address of an interface which roams to the home PMIPv6 domain/the foreign CMIPv6 domain, transmits a BU message of CMIPv6 via an interface which behaves in different type of roaming, and records a sequence number which is used in the BU message of CMIPv6. MN may carry out the procedure of Step S316 at the same time when it carries out the procedure of Step S315.

In this Step S316, MN sets up a message (a message corresponding to the message 263 in FIG. 2A). This message may have the current CMIPv6 sequence number (a sequence number already transmitted or a sequence number to be transmitted subsequently) and may be an ICMPv6 message, which has BID/ID of the roaming interface as, described above.

In Step S316, MN further transmits an ICMPv6 message as set up above to MAG, which belongs to the home PMIPv6 domain of MN and to which the interface of MN is connected without roaming.

A destination address of the ICMPv6 message as given above may be a link local address or a global IPv6 address. Similarly, a source address of the ICMPv6 message may be a link local address of MN or a global IPv6 address, for which routing can be made.

In the interfaces of MN, if there is no interface which has roamed from the home PMIPv6 domain to the foreign CMIPv6 domain, or in case there is no interface of MN which is connected to the home PMIPv6 domain, (i.e. in case of "No" in Step S314), the procedure of Step S317 is carried out. In this Step S317, it is checked whether or not one of the interfaces of MN has roamed from the foreign CMIPv6 domain to the home PMIPv6 domain and at least one of the other interfaces is connected to the home PMIPv6 domain without roaming.

In case none of the interfaces of MN has roamed from the foreign CMPIv6 domain to the home PMIPv6 domain or in case none of the interfaces of MN is connected to the home PMIPv6 domain (i.e. the case of "No" in Step S317), it means that the change of connection from the home PMIPv6 domain to the CMIPv6 domain has occurred in none of the interfaces. Then, a normal PMIPv6 operation or a normal home network operation is carried out at MN (Step S320).

On the other hand, in case, among the interfaces of MN, there is one interface which roamed from the foreign CMIPv6 domain to the home PMIPv6 domain, and in case an interface of MN is connected to the home PMIPv6 domain (i.e. the case of "Yes" in Step S317), the race problem as given above (i.e. a problem that the current BU of PMIPv6 is overwritten by an older BU of CMIPv6) may occur. In such case MN carries out the procedure of Step S318.

In Step S318, connection is simply made to the home PMIPv6 domain by a roaming interface, and normal access authentication or address arrangement is carried out. Also, MN carries out the procedure of Step S319 after or during the execution of the procedure of Step S318. The procedure of this Step S319 is almost the same as the operation in Step S316, while, with regard to the roaming interface, MN transmits a sequence number of a BU message of CMIPv6 in the past (i.e. a sequence number of the BU message of CMIPv6 transmitted before the roaming) to MAG which belongs to the home PMIPv6 domain and which is the destination of connection of the interface not roaming and being connected to the home PMIPv6 domain. In case the connection to the home PMIPv6 domain is already made by the roaming interface, it is possible to perform transmission to MAG which is the destination of connection of the interface. However, when it is before the connection of the roaming interface or when transmission is made at the same time as the connection of the roaming interface, it is desirable that transmission is made via the interface which does not roam and is connected to the home PMIPv6 domain.

In Step S319, by an ICMPv6 message having a predetermined parameter (a sequence number or IF-ID/BID used in the past), MN requests MAG to transmit a message to indicate that the current adequate binding relating to the roaming interface is the home PMIPv6 binding to LMA/HA. In this case, it is not always necessary to add the time stamp option to this message when the message is transmitted to LMA/HA. Therefore, there may be a case where a message of a type different from the message 264 or FIG. 2A may be transmitted.

In case MAG adds the time stamp option, it is useful when LMA/HA identifies that the PMIPv6 binding sent via the roaming interface was transmitted at considerably recent time. On the other hand, when the connection of the interface is changed from a foreign domain to a home PMIPv6 domain, LMA/HA identifies the old CMIPv6 binding by using only an old sequence number in the past, which was received via an interface not in roaming. For instance, when a message having an old sequence number of the BU message of CMIPv6 (i.e. a message similar to the message 264 or FIG. 2A) reaches LMA/HA, LMA/HA identifies that the present CMIPv6 binding is older than the PMIPv6 binding, and that it is better to immediately invalidate the CMIPv6 binding.

It is desirable that the message is set up so that judgment can be made easily at LMA/HA, and that it is possible to indicate that the CMIPv6 binding (i.e. the sequence number) given by MN is a new number or an old number. By referring to the information to indicate that the sequence number is new or old, LMA/HA can easily judge that the CMIPv6 binding should be validated or invalidated.

In order to avoid the mixing with a different notification message due to a subsequent handover of MN, it is desirable that LMA/HA confirms the CMIPv6 binding to be invalidated and checks whether the CMIPv6 binding indicated by MN is new or old. For instance, the binding with a sequence number older than the sequence number of the CMIPv6 binding as indicated by MN should be invalidated. If the sequence number of the CMIPv6 binding identified by LMA/HA is newer, it would be necessary to consider the possibility that it is a binding for the address of CMIPv6 which MN has acquired in association with a subsequent handover.

Figure 4A:
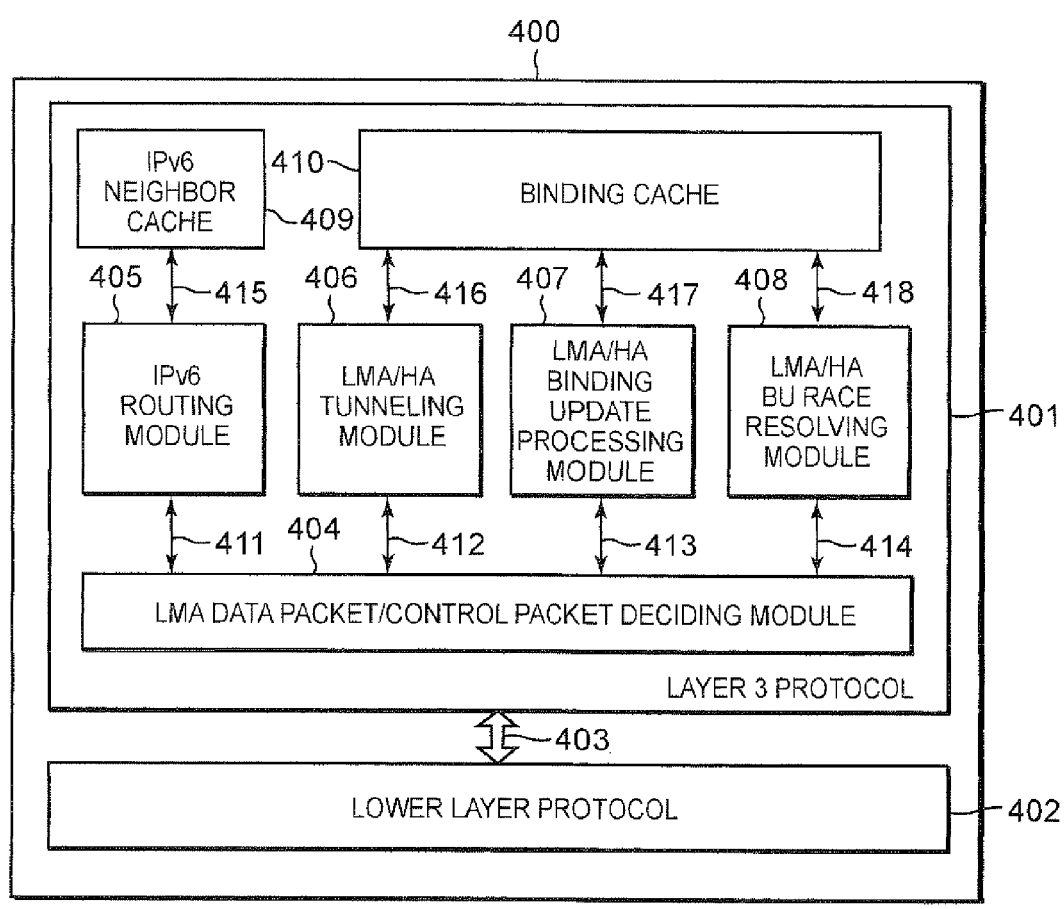
FIG. 4A is a block diagram to show an arrangement example of LMA/HA in the first embodiment of the invention.

Next, description will be given on functional architecture of LMA/HA to carry out the first embodiment of the invention. FIG. 4A is a block diagram to show an arrangement example of LMA/HA in the first embodiment of the invention.

The functional architecture of LMA/HA 400 as shown in FIG. 4A has all types of software, hardware and firmware necessary for providing a protocol stack relating to IPv6 to carry out the first embodiment of the invention. LMA/HA 400 may have an upper layer protocol, but it is now shown in FIG. 4A.

A lower layer protocol 402 shown in FIG. 4A has the functions of a physical layer and a data link layer.

Also, a layer 3 protocol 401 has all types of routing-related protocols and routing layer modules necessary to carry out the present invention. The layer 3 protocol 401 and the lower layer protocol 402 receive and deliver packets (data packet and control packet) via an interface 403.

In FIG. 4A, the layer 3 protocol 401 (i.e. a routing layer protocol) has an IPv6 routing module 405, an LMA/HA tunneling module 406, an LMA/HA binding update processing module 407, an LMA/HA BU race resolving module 408, an IPv6 neighbor cache 409, and a binding cache 410.

The IPv6 routing module 405 has a function to carry out various types of packet processing including routing function of an IPv6 packet. Basically, it is the same as the IPv6 routing module of MN 300 shown in FIG. 3A, and detailed description is not given here. This IPv6 routing module 405 performs interaction with the IPv6 neighbor cache 409 and supports the setting up of the packet to forward the data.

The LMA/HA tunneling module 406 is used to realize a direct tunneling from LMA/HA 400 to MN, a direct tunneling from LMA/HA 400 to MAG, which is connected to MN, or a tunneling in reverse direction to these. When a data packet destined to the home address of MN is received, LMA/HA can tunnel the packet by using one of a plurality of interfaces or the care-of address of MN by means of the LMA/HA tunneling module 406. In case the care-of address selected at the LMA/HA tunneling module 406 is present at a CMIP entry of the binding cache 410, the packet is directly tunneled to MN. In case the selected care-of address belongs to MAG, the packet is tunneled to MAG on behalf of MN.

Because the LMA/HA tunneling module 406 performs tunneling processing as such, it is necessary to perform interaction with the binding cache 410, and parameters necessary for the tunneling are sent to LMA/HA tunneling module 406 from the binding cache 410 via an interface 416.

The LMA/HA binding update processing module 407 is used to carry out the processing on the CMIPv6 binding and the PMIPv6 binding. This LMA/HA binding update processing module 407 can perform processing separately on the CMIPv6 binding and the PMIPv6 binding, which belong to the same BID of the same MN, and can deliver parameters to the binding cache 410 via an interface 417.

The LMA/HA BU race resolving module 408 has a function to perform processing on a message which notifies the roaming from the home PMIPv6 domain to the foreign CMIPv6 domain (or the roaming in reverse direction), (e.g. the message 264 or FIG. 2A), a function to add marking on a valid binding present in the binding cache 410, a function to judge a valid binding by comparing the PMIPv6 binding with the CMIPv6 binding (e.g. through comparison of time information), and a function to delete (or invalidate) an erroneous binding when a message similar to the message 264 of FIG. 2A is received and LMA/HA 400 registers an erroneous binding without becoming conscious of the race problem.

An LMA data packet/control packet deciding module 404 has a function to decide as to which module a data packet and/or control packet received by LMA/HA 400 should be supplied. This LMA data packet/control packet deciding module 404 basically performs interaction with each of the modules 405, 406, 407 and 408 via interfaces 411, 412, 413 and 414 respectively. The LMA data packet/control packet deciding module 404 is merely an example of a method to fulfill a preferable packet distributing function, and the same function as that of the LMA data packet/control packet deciding module 404 may be fulfilled by any other arbitrary arrangement or method.

The binding cache 410 stores the PMIPv6 binding as LMA and also stores the CMIP binding as HA. Also, it is possible to support the multi-homing and to manage the registration of a plurality of care-of addresses to the interfaces of MN by using BID, for instance.

Next, description will be given on operation of an LMA/HA BU race resolving module of LMA/HA in the first embodiment of the invention. FIG. 4B is a flowchart to show an operation example of the LMA/HA BU race resolving module of LMA/HA in the first embodiment of the invention.

In FIG. 4B, LMA/HA first carries out the procedure of Step S419. In Step S419, it is checked whether the packet is destined to a node, which is directly connected to LMA/HA, or in case it is destined to other address, it is checked whether or not the address prefix is not under management of LMA/HA (a prefix not included in the address prefixes of LMA/HA).

In case the received packet is a packet which should be processed by routing as a normal HA or router (in case of "Yes" in Step S419), LMA/HA performs normal routing processing similar to the IPv6 routing mechanism on the packet in Step S420. Specifically, in case LMA/HA performs interception and transfer of the packet as HA, or in case it has a function as a router which transfers the packet destined to the node not under direct management, normal routing processing is carried out. On the other hand, in case the received packet is a packet, on which normal routing processing should not be conducted (in case of "No" in Step S419), LMA/HA checks whether the destination address of the packet is the address of LMA/HA or not in Step S421.

Here, if the packet is not destined to LMA/HA (in case of "No" in Step S421), LMA/HA must tunnel the packet to MAG where MN is connected in Step S422. This MN has acquired the prefix specific to each MN from LMA/HA (LMA), and the address prefix of MN is under management of LMA/HA.

On the other hand, if the packet is destined to LMA/HA (in case of "Yes" in Step S421), the procedure of Step S423 is carried out. In Step S423, it is checked whether the received packet (message) is an MIPv6 BU message where a proxy flag is set to indicate whether it is a proxy transmission by MAG or not.

In case the received packet is a MIPv6 BU message where the proxy flag is set to ON (in case of "Yes" in Step S423), the procedure of Step S424 is carried out. In Step S424, LMA/HA checks whether a race condition occurs or not on a single interface which roams within the PMIPv6 domain. For instance, in case a PMIPv6 binding of the same interface as the interface relating to the binding (IF-ID) as specified on the received packet is present in the binding cache, a race condition occurs.

In case a race condition occurs in a single interface, which roams within the PMIPv6 domain (in case of "Yes" in Step S424), LMA/HA discards the older PMIPv6 binding in Step S425. On the other hand, in case no race condition occurs in a single interface which roams within the PMIPv6 domain (in case of "No" in Step S424), no race condition occurs, and LMA/HA regards the PMIPv6 binding by PBU as valid in Step S426 and registers it in the binding cache.

In case the received packet is not an MIPv6 BU message where the proxy flag is set to ON (in case of "No" in Step S423), LMA/HA checks in Step S427 whether the received message is another signaling message or not, which has the same function as that of the message 264 of FIG. 2A (i.e. a message having IF-ID/BID of the interface in roaming from the home PMIP to CMIP and having the sequence number and the time stamp option of the current CMIPv6 BU message).

When the message intercepted is similar to the message 264 of FIG. 2A (i.e. in case of "Yes" in Step S427), this message is to notify the roaming from the home PMIPv6 domain to the foreign CMIPv6 domain, and, by retrieving the binding cache, LMA/HA first checks whether a correct CMIPv6 binding is already registered or not in Step S428. This retrieval can be carried out by using IF-ID/BID and the sequence number. In case the CMIPv6 binding is already registered, the CMIPv6 binding having this IF-ID/BID and the sequence number is marked as a valid binding. The time information of the received time stamp option may be placed in the CMIPv6 cache.

On the other hand, in case this CMIPv6 binding is not registered, the time information of the time stamp option and the sequence number are temporarily stored as other variables. In case the CMIPv6 binding by the roaming interface reaches, by referring to the information stored as a temporary variable, this CMIPv6 binding can be marked as a correct binding. If the CMIPv6 binding is not present at LMA/HA and an incorrect PMIPv6 binding is present, LMA/HA deletes the PMIPv6 binding, and the CMIPv6 binding is registered when the correct CMIPv6 binding or a new CMIPv6 BU message reaches. When the old PBU message arrives, this PBU message is discarded according to the value of the time stamp.

Also, in case the received message is not a message similar to the message 264 of FIG. 2A (Le. in case of "No" in Step S427), this message is to notify the roaming from the foreign CMIPv6 domain to the home PMIPv6 domain, and LMA/HA checks whether it has the sequence number of the old CMIPv6 BU message (i.e. the BU message which has been transmitted before the roaming) or not.

In case this message contains the old sequence number and is a message to notify the roaming from the foreign CMIPv6 domain to the home PMIPv6 domain (i.e. in case of "Yes" in Step S429), the procedure of Step S430 is carried out.

In Step S430, the following processing is carried out: That is, in case a new binding in relation to the roaming interface (i.e. the PMIP binding) is present in the binding cache, it is noted that this entry is valid and the sequence number of the received CMIPv6 BU message is temporarily stored.

On the other hand, in case an incorrect CMIPv6 binding having the same sequence number (i.e. the CMIPv6 binding which was used before the roaming of MN) is present in the binding cache, this CMIPv6 binding is deleted. In case an old CMIPv6 BU message arrives, this BU message is discarded according to the sequence number of the old CMIPv6 BU message.

In case the old sequence number is included and it is not a message to notify the roaming from the foreign CMIPv6 domain to the home PMIPv6 domain (i.e. in case of "No" in Step S429), LMA/HA checks in Step S431 whether this message is simply the CMIPv6 BU message or not.

If this message is simply the CMIPv6 BU message (i.e. in case of "Yes" in Step S431), LMA/HA compares the sequence numbers and identifies the order of the packet in Step S432 and identifies the validity of the CMIPv6 binding. For instance, by comparing the sequence number of the intercepted BU message with the sequence number of the binding cache registered in the binding cache in Step S432, a CMIPv6 binding transmitted later (i.e. a new CMIPv6 binding) is identified. On the other hand, in case this message is not the CMIPv6 BU message (i.e. in case of "No" in Step S431), it is considered as a message (different from the message to be dealt with in the present invention) from MN to LMA/HA. Then, a different message processing by LMA/HA (i.e. normal processing on a message different from the message to be dealt with in the present invention) is carried out (Step S450).

In case the CMIPv6 of the intercepted message is older (i.e. in case of "Yes" in Step S432), the procedure of Step S433 has been carried out, and the packet is discarded. On the other hand, in case CMIPv6 of the intercepted message is newer (i.e. in case of "No" in Step S432), the procedure of Step S434 is carried out, and the CMIPv6 binding included in the intercepted message is registered in the binding cache.

Next, description will be given on a fault condition, which may occur in the first embodiment of the invention, and on the recovery method to be taken by LMA/HA.

For instance, when a message relating to old registration of the roaming interface reaches later than a notification message which notifies a current connection condition (connected to the CMIPv6 domain or to the PMIPv6 domain) due to the roaming to different types of domain of the interface (roaming from the CMIPv6 domain to the home PMIPv6 domain), a fault may occur that new information may be overwritten by old information).

When such fault has occurred, LMA/HA may overwrite the valid binding by an older binding, and packet loss may occur or the packet may be transmitted and received via an interface not desired by MN (until the time when a new CMIPv6 refreshed BU message reaches from the roaming interface or until the time when a new refreshed PBU message reaches from MAG which is connected to the roaming interface.

As explained in the above embodiment, LMA/HA has an old binding in relation to the interface, and when a message to notify a new condition of the interface (i.e. the message 264 of FIG. 2A) is intercepted, LMA/HA deletes the old binding. However, the interface of MN relating to the binding deleted by LMA/HA cannot be used until the time when a valid binding relating to this interface arrives.

Now, referring FIG. 5A and FIG. 5B, description will be given on a method to quickly acquire a new binding relating to the roaming interface when the fault as described above occurs. In FIG. 5A, the 3G interface of MN 500 is connected to MAG 520, and it is assumed that the WLAN interface carries out different type roaming from the home PMIPv6 domain to the foreign domain (change from the home PMIP domain 530 to the CMIPv6 domain 531).

Also, as shown in FIG. 5B, it is supposed that BC 560 has an adequate entry created by the PBU message transmitted from MAG 520. The entry as given above is represented by a first entry of BC 560. Further, it is assumed that MN 500 transmits a CMIPv6 BU message 561 to LMA/HA 550 via AR 522. The entry of BC to be created when this message 561 reaches LMA/HA 550 is represented by a second entry of BC 560.

After transmitting a message 561, MN 500 transmits a message 562 to notify a type of information which can identify the CMIPv6 BU 561 such as the BID of the WLAN interface and the sequence number of the CMIPv6 BU 561 to MAG 520, and requests MAG 520 to transmits a message which contains the above parameters and the time stamp option.

In this case, if MAG 520 transmits a message 564 based on the message 562 received from MN 500 (i.e. a message containing BID, sequence number and time stamp option), it is assumed that this message 564 reaches later than the message 563. The message 563 is a message which is transmitted from MAG 521 where the WLAN interface has been connected before the roaming and which is relating to the PMIPv6 binding (i.e. an old PMIPv6 binding).

When this message 563 reaches earlier than the message 564, a correct entry (a second entry) is deleted by LMA/HA, and an entry of an old PBU message 563 is created at BC 560. This set of incorrect entry is represented by a third entry of BC 560.

When the message 564 reaches LMA/HA 550, LMA/HA 550 checks the time stamp option in the message 564 and the time stamp option to the old PBU entry, and compares these two with each other. By this comparison, LMA/HA identifies that the PMIPv6 cache of the WLAN interface is not correct, and deletes the set of the incorrect entry (a third entry).

Then, instead of waiting for the refresh BU as described above, LMA/HA 550 tunnels a binding refresh request message (BRR message) to MN 500 via MAG 520. This message is represented by a message 565 in FIG. 5A, and it is to urge re-transmission of the BU message to MN 500. It is desirable that ID or BID information of the WLAN interface is included in this message 565 as an option. Also, this message 565 is transmitted to the home address of MN 500.

Because LMA/HA 550 does not have a valid binding in relation to the WLAN interface of MN 500, LMA/HA 550 transmits the message 565 via the other interface (3G interface). When this message 565 reaches MN 500, MN 500 transmits a CMIPv6 BU message including a valid binding and creates a valid CMIPv6 binding at LMA/HA 550. The above is the method of operation by LMA/HA to resolve a race condition of the message and the old PBU message according to the present invention. In case such problem may occur due to the change of connection from CMIPv6 domain 531 to the home PMIPv6 domain 530, MN 500 requests MAG 521 to transmit another PBU to LMA/HA 550 when a binding refresh request message is received by MN 500. Or, it may be so arranged that LMA/HA 550 keeps the binding which is once judged as to be deleted in a deletion waiting state to cope with the occurrence of a race condition for a certain period of time before transmitting the binding refresh request message and may wait for notification of identification information to resolve the race condition from MN 500.

The Second Embodiment

Figure 6:
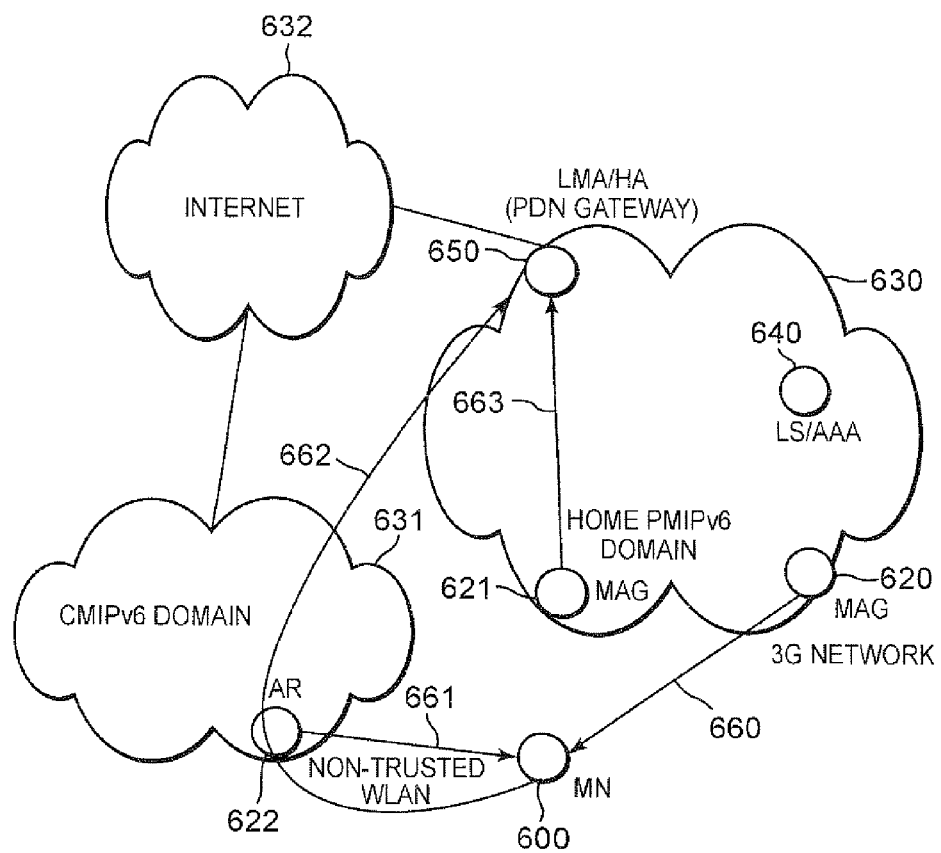
FIG. 6 is a schematical drawing to show system configuration to explain general features of a second embodiment of the invention.

Next, description will be given on a second embodiment of the invention. Referring to FIG. 6, description will be given on the second embodiment of the invention. According to this embodiment, MN solves the problem of the race condition at LMA/HA by obtaining time information (information to generate time stamp) from the home PMIP domain.

In FIG. 6, the 3G interface of MN 600 is connected to MAG 620, and the WLAN interface roams to a foreign domain 631 from MAG 620 with which it has been connected before the roaming. When RA 661 is received from AR 622, MN 600 becomes aware that it is necessary to send a CMIPv6 BU to LMA/HA 650 and transmits a BU message 662. In this case, MN 600 adds the current time information to this CMIPv6 BU message, and even in case where a PBU message 663 having the time stamp option may arrive later from MAG 621, LMA/HA 650 can identify a correct binding of the current binding of the WLAN interface by referring to the time information added to each of the BU message 662 and the PBU message 663.

Prior to the transmission of the CMIPv6 BU message 662, MN 600 requests MAG 620 to deliver the current time information to MN 600. When MN 600 acquires the time information via the message 660, MN 600 transmits the CMIPv6 BU message 662 having the time stamp option with the PMIPv6 domain. The time information acquired from MAG 620 indicates the time synchronized with the home PMIPv6 domain.

In the second embodiment of the invention, it is desirable that MN 600 acquires the time information to be added to the BU message 662 from the PMIPv6 domain by giving a certain signaling. Further, it is necessary to transmit the CMIPv6 BU message after completing the processing to acquire the time information.

The Third Embodiment

Figure 7:
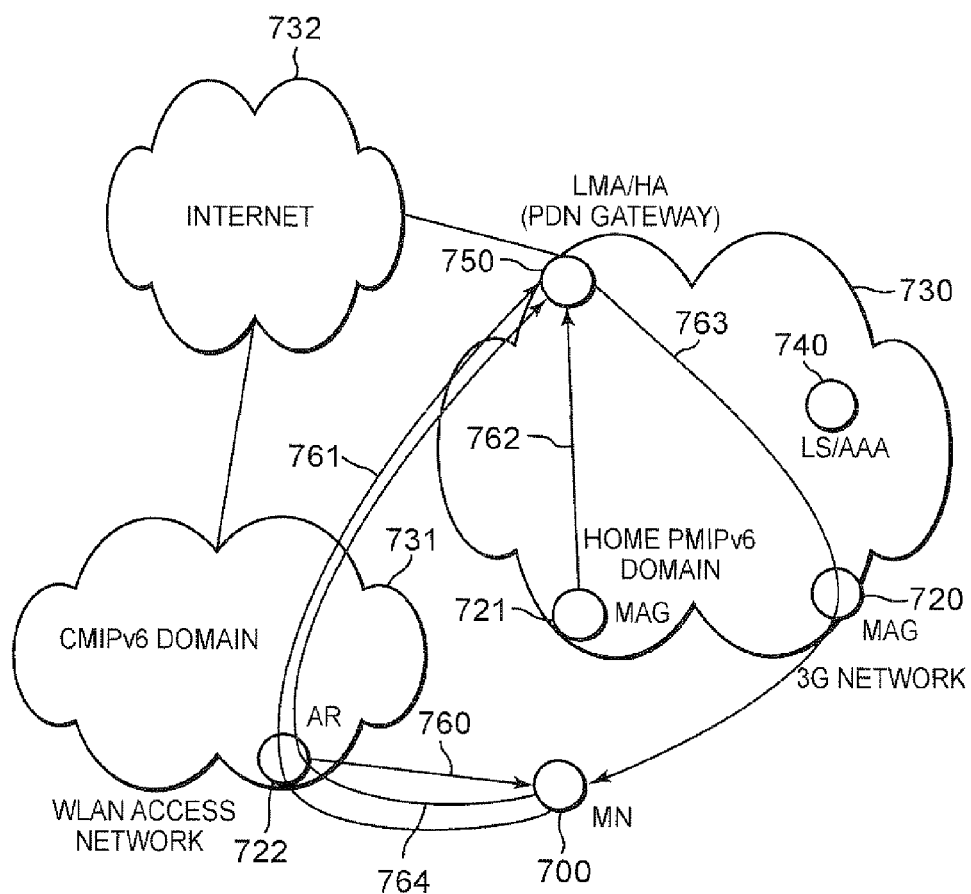
FIG. 7 is a schematical drawing to show system configuration to explain general features of a third embodiment of the invention.

Next, description will be given on a third embodiment of the invention. Referring to FIG. 7, description will be given below on the third embodiment of the invention. In the method of the third embodiment, when LMA/HA judges that a race condition is very likely to occur, LMA/HA newly instructs MN to notify the newest binding.

Here, too, it is supposed that the 3G interface of MN 700 is connected to MAG 720. Further, it is supposed that the WLAN interface of MN 700 is connected to MAG 721 prior to the roaming, and that it is currently connected to AR 722.

In case MN 700 has changed the connection from MAG 720 of the home PMIPv6 domain to AR 722 of CMIPv6 domain 731 (or vice versa), a race condition occurs from the home PMIPv6 domain 730 to the CMIPv6 domain 731 or from the CMIPv6 domain to the home PMIPv6 domain 730. Here, in case the BU message and the PBU message relating to CUP binding reach at a certain time interval (i.e. time interval within a time period as determined in advance), LMA/HA 750 estimates that a race condition may have occurred. When the possibility of the occurrence of a race condition is estimated, LMA/HA 750 requests MN 700 to transmit the current binding of the roaming interface via an interface which is not roaming.

In FIG. 7, MN 700 first receives RA 760 from AR 722. It is supposed here that a message 762 is transmitted from MAG 721 before MN 700 transmits a CMIPv6 BU message 761. Further, it is supposed that the message 762 reaches LMA/HA 750 after the BU message 761 and a race condition occurs. Also, it is supposed that the time interval between the interception of these messages 761 and 762 is considerably shorter at LMA/HA 750.

In this case, LMA/HA 750 transmits a new message 763 to the 3G interface of MN 700 by tunneling via MAG 720 and requests MN 700 to transmit a binding of the current connection of the WLAN interface. In case the current connection of the WLAN interface is a CMIPv6 connection, MN 700 transmits a BU message 764. On the other hand, if the current connection of the WLAN network is a home PMIPv6 connection, MN 700 requests MAG 721 to transmit the PBU message 762 again. LMA/HA 750 can directly transmits the message 763 to MAG 720.

This message 763 is to notify a home prefix of MN 700 and a BID and others of the WLAN interface to MAG 720 and to request MAG 720 to transmit the binding of the currently connected binding of the WLAN interface to MN 700. In FIG. 7, the current connection of the WLAN interface is a CMIPv6 connection, and MN 700 transmits a BU message 764. Then, the race problem can be solved when this BU message reaches LMA/HA.

The Fourth Embodiment

Figure 8:
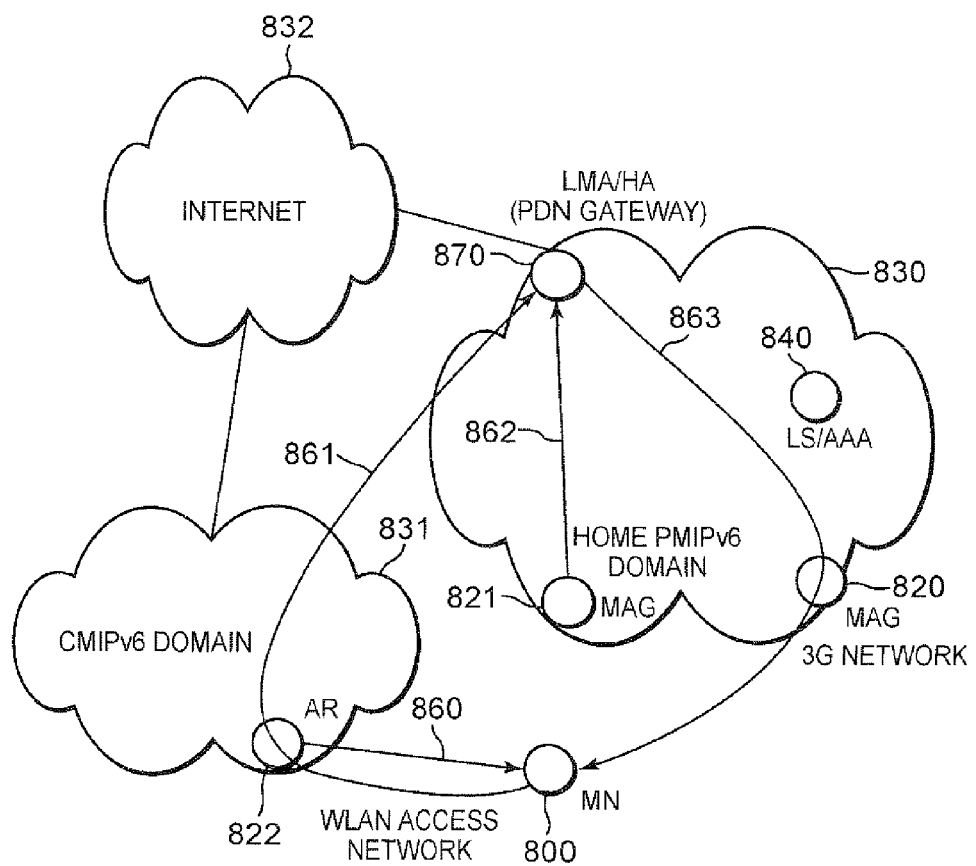
FIG. 8 is a schematical drawing to show system configuration to explain general features of a fourth embodiment of the invention.

Next, description will be given on a fourth embodiment of the invention. Referring to FIG. 8, the fourth embodiment of the invention will be described. According to this method, in case LMA/HA judges that a race condition is very likely to occur, the occurrence of the race condition (or its possibility) is notified to MN, and it is so arranged that an interface not in roaming can be temporarily used during the time while waiting for the notification from MN (re-notification of correct binding information).

In the fourth embodiment of the invention, description will be given on an example derived from the method explained in the first embodiment. In FIG. 8, it is supposed that the 3G interface of MN 800 is connected to MAG 820, and that the WLAN interface roams from a home PMIPv6 domain 830 to a CMIPv6 domain 831. This means that the WLAN interface is first connected to MAG 821 and it has then roamed and is now connected to AR 822. In such case, a race condition may occur.

In the fourth embodiment, description will be given on a method, according to which MN 800 can identify that a race condition may occur when connection is quickly changed from MAG 821 of the home PMIPv6 domain 830 to a foreign AR 822. When it is estimated that race problem may occur, by using a CMIPv6 BU message 861 having a certain option or a flag to indicate the possibility of the occurrence of the race condition, MN 800 requests LMA/HA 850 to transmit a data packet via another interface (3G interface) not in roaming of MN 800 until a new binding update or a refresh binding update message relating to the interface currently in roaming arrives. After the interception of the message 861, the data packet is transmitted as indicated in the message 863 until the refresh BU message is transmitted from MN 800 via the WLAN interface.

In the present specification, figures are shown and descriptions are given so that the present invention can provide the most practical and the most preferred embodiment, while it would be obvious to those skilled in the art that any changes and modifications can be made without departing from the spirit and the scope of the invention in the detailed design and parameters relating to component elements of each of the devices as described above.

In the above, description has been given on a method, according to which MN explicitly requests MAG to add the time stamp option, while there is no need to explicitly indicate in a system where the time information is given to the information which MAG transmits to LMA/HA. When different conditions are present in mixed state, operation may be carried out after MN makes inquiry in advance as to whether the addition of the time stamp option should be explicitly requested or not.

In the present specification, description is given on the assumption that there are a plurality of network interfaces at MN, while it would suffice if there are a plurality of logical interfaces for the purpose of carrying out the invention. For instance, it may be so arranged that a single radio unit is commonly shared by a plurality of connection modes and the change may be made at a speed, which may not cause problem from the viewpoint of the network interface. Or, by maintaining a local link on the layer 2, operation can be performed in the same manner as the case where connection is made via a plurality of interfaces from the network side.

Also in the present specification, description is given on the home PMIP domain in the case where the 3GPP network plays a principal part (i.e. an interface not in roaming), while it may be a different access network where WiMAX, WLAN, etc. are used.

Each functional block used in the description of the embodiments of the present invention as given above can be realized as LSI (Large Scale Integration), typically represented by the integrated circuit. These may be produced as one chip individually or may be designed as one chip to include a part or all. Here, it is referred as LSI, while it may be called IC, system LSI, super LSI, or ultra LSI, depending on the degree of integration.

Also, the technique of integrated circuit is not limited only to LSI and it may be realized as a dedicated circuit or a general-purpose processor. FPGA (Field Programmable Gate Array), which can be programmed after the manufacture of LSI, or a reconfigurable processor, in which connection or setting of circuit cell inside LSI can be reconfigured, may be used.

Further, with the progress of semiconductor technique or other techniques derived from it, when the technique of circuit integration to replace LSI may emerge, the functional blocks may be integrated by using such technique. For example, the adaptation of biotechnology is one of such possibilities.

INDUSTRIAL APPLICABILITY

A mobile terminal, a network node, and a packet transfer management node according to the present invention provide such effects that a race condition between a PMIPv6 binding by a PBU message of PMIPv6 and a CMIPv6 binding by a BU message of CMIPv6 can be resolved. The invention can be applied to the field of communication technique in a system of packet-exchange type data communication network (in particular, in a network system where a network-based local mobility management protocol such as PMIP is provided).

The invention claimed is:

1. A mobile terminal, comprising:
a plurality of radio communication interfaces;
a mobile IP module to fulfill a mobile IP function; and
a protocol switch module configured to transmit identification information to identify a binding update message transmitted from a first radio communication interface among said plurality of radio communication interfaces or to identify a binding update message to be transmitted from said first radio communication interface among said plurality of radio communication interfaces,
wherein the protocol switch module transmits said identification information from a second radio communication interface connected to a home domain where a network-based local mobility management protocol is provided among said plurality of radio communication interfaces;
wherein the protocol switch module transmits a request to a network node where said second radio communication interface is connected, to notify a packet transfer management node in said home domain by adding current time information to said identification information;
wherein said identification information is transmitted from said second radio communication interface when said first radio communication interface changes connection destination from said home domain to another domain and has transmitted or is going to transmit said binding update message from said first radio communication interface.

2. The mobile terminal according to claim 1, wherein said network node where said second radio communication interface is connected has a function to add time information based on said identification information of said binding update message to said current time information in response to said request, and said network node makes a request when said network node has the function to add the time information.

3. The mobile terminal according to claim 1, wherein interface identification information to identify said first radio communication interface, address identification information to identify an address to be set on said first radio communication interface, and a sequence number included in said binding update message are used as said identification information.

4. The mobile terminal according to claim 1, wherein said binding update message is used as said identification information.

5. The mobile terminal according to claim 1, wherein said protocol switch module is so arranged that a type of information to indicate that the binding information of said binding update message to be identified by said identification information is the newest information; and
 a packet transfer management node in said home domain can identify that said binding information is valid by receiving the information to indicate that said binding information is the newest, together with said identification information.

6. The mobile terminal according to claim 1, wherein it is so arranged that, in case said first radio communication interface changes connection destination from another domain to said home domain, said first radio communication interface transmits identification information of said binding update message transmitted when said first radio communication interface was connected to said another domain.

7. The mobile terminal according to claim 6, wherein it is so arranged that said protocol switch module transmits a type of information to indicate that the binding information of said binding update message to be identified by said identification information is not the newest information, together with identification information of said binding update message; and
 it is possible to identify that said binding information is invalid when the packet transfer management node in said home domain receives, together with said identification information, a type of information to indicate that said binding information is not the newest information.

8. The mobile terminal according to claim 1, wherein said protocol switch module acquires current time information from said home domain at the time when transmitting said identification information; and
 said protocol switch module transmits said current time information together with the identification information of said binding update message.

9. A packet transfer management node, being present in a network domain where a network-based mobility management protocol is carried out, being used for managing packet transfer within said network domain, and fulfilling a function as a mobile IP home agent, wherein said packet transfer management node comprises:
 a mobile IP binding cache configured to store binding information of a node to be managed by said mobile IP home agent;
 a communication module configured to perform communication with a local management node, said local management node functioning as a local mobility anchor of said network-based mobility management protocol, and having local binding cache configured to store binding information of a node to manage by said local mobility anchor; and
 a binding information processing module configured to receive identification information and time information from said local management node via said communication module, identify a binding in said mobile IP binding cache based on said identification information, and associate said identified binding information with said time information in case said identification information to identify a binding update message transmitted by said mobile terminal via a first radio communication interface and time information added are received by said local management node from a network node in said network domain and being able to be a connection point to said home domain with respect to a mobile terminal, having said network domain as a home domain,
 wherein said identification information is transmitted from a second radio communication interface of the mobile terminal when said first radio communication interface of the mobile terminal changes connection destination from said home domain to another domain and has transmitted or is going to transmit said binding update message from said first radio communication interface.

10. The packet transfer management node according to claim 9, wherein it is checked whether or not there is other binding information relating to said radio communication interface where said binding information to be identified by said identification information received is set up within said mobile IP binding cache, and in case said other binding information is present, the time information of each binding information is checked and binding information having the time information to indicate the latest time is set up as valid binding information.

11. The packet transfer management node according to claim 10, wherein, in case unnecessary binding information is present in said mobile IP binding cache, said unnecessary binding information is left in invalid state, and in case the binding information having time information to indicate the latest time is set in invalid state, the binding information set in invalid state is to be set as valid binding information.

12. The packet transfer management node according to claim 11, wherein it is so arranged that said unnecessary binding information is deleted when a certain predetermined time period has elapsed with said unnecessary binding information set in invalid state.

13. The packet transfer management node according to claim 10, wherein, in case the binding information relating to said binding update message is not present in said mobile IP binding cache although the time information to indicate the latest time is said time information transmitted together with the identification information of said binding update message, it is so arranged that said binding update message is to be re-transmitted to said mobile terminal.

14. The packet transfer management node according to claim 9, wherein, in case unnecessary binding information is present in said mobile IP binding cache, it is so arranged that said unnecessary binding information is left in a state where said unnecessary binding information is set as invalid.

15. The packet transfer management node according to claim 14, wherein said unnecessary binding information is deleted when a certain predetermined time period has elapsed while said binding information is left in invalid state.

16. The packet transfer management node according to claim 9, wherein it is checked whether or not there is other binding information relating to said radio communication interface where said binding information to be identified by said identification information received is set up within said mobile IP binding cache, and in case said other binding information is binding information to be identified by the identification information being the same as or older than said identification information received, it is so arranged that said other binding information is made invalid.

17. The packet transfer management node according to claim 9, wherein, in case a type of information to indicate that the binding information of said binding update message identified by said identification information is the newest information has been received together with identification information of said binding update message, it is so arranged that said binding information of said binding update message to be identified by said identification information is regarded as valid.

18. The packet transfer management node according to claim 9, wherein, in case a type of information to indicate that the binding information of said binding update message identified by said identification information is not the newest information has been received together with identification information of said binding update message, it is so arranged that said binding information of said binding update message to be identified by said identification information is regarded as invalid.

19. The packet transfer management node according to claim 9, wherein, in case time interval between the receiving time of said binding information identified by said identification information and the receiving time of another binding information relating to said radio communication interface where said binding information identified by said received identification information is set is shorter than a predetermined time period, it is so arranged that said mobile terminal is requested to re-notify binding information relating to said radio communication interface.

20. The packet transfer management node according to claim 9, wherein, in case a race condition of binding information is detected in the same radio communication interface, the fact that said race condition has been detected is notified to said mobile terminal, and another radio communication interface different from said radio communication interface where said race condition has been detected can be used temporarily.

21. A packet transfer management node, being present in a network domain where a network-based mobility management protocol is carried out, being used for managing packet transfer within said network domain, and fulfilling a function as a local mobility anchor of said network-based mobility management protocol, wherein said packet transfer management node comprises:
   a local binding cache configured to store binding information of a node to be managed by said local mobility anchor;
   a communication module configured to perform communication with a global management node, said global management node functioning as a mobile IP home agent, and having a mobile IP binding cache configured to store binding information of a node to be managed by said mobile IP home agent; and
   a binding information processing module configured to identify a binding in said mobile IP binding cache based on identification information, and associate said identified binding information with said time information by delivering said identification information and said time information to said global management node via said communication module in case said identification information to identify a binding update message transmitted by said mobile terminal via a first radio communication interface and time information added are received by said local management node from a network node in said network domain and being able to be a connection point to said home domain with respect to a mobile terminal, having said network domain as a home domain,
   wherein said identification information is transmitted from a second radio communication interface of the mobile terminal when said first radio communication interface of the mobile terminal changes connection destination from said home domain to another domain and has transmitted or is going to transmit said binding update message from said first radio communication interface.

22. A packet transfer management node, being present in a network domain where a network-based mobility management protocol is carried out, being used for managing packet transfer within said network domain, and fulfilling a function as a mobile IP home agent and a function as a local mobility anchor of said network-based mobility management protocol, wherein said packet transfer management node comprises:
   a binding information cache configured to store binding information of a node managed by said mobile IP home agent and said local mobility anchor; and
   a binding information processing module configured to identify a binding in said binding information cache based on identification information, and associate said identified binding information with said time information in case said identification information to identify a binding update message transmitted by said mobile terminal via a first radio communication interface and time information added are received by a local management node from a network node in said network domain and being able to be a connection point to said home domain with respect to a mobile terminal, having said network domain as a home domain,
   wherein said identification information is transmitted from a second radio communication interface of the mobile terminal when said first radio communication interface of the mobile terminal changes connection destination from said home domain to another domain and has transmitted or is going to transmit said binding update message from said first radio communication interface.

* * * * *